(12) United States Patent
Heines et al.

(10) Patent No.: US 6,600,474 B1
(45) Date of Patent: Jul. 29, 2003

(54) MICRO-MECHANICAL FLAT-PANEL DISPLAY

(75) Inventors: Amichai Heines, Herzelia (IL); Adiel Karty, Zichron-Yaacov (IL)

(73) Assignee: Flixel Ltd., Tel-Aviv (IL)

( * ) Notice: Subject to any disclaimer, the term of this patent is extended or adjusted under 35 U.S.C. 154(b) by 0 days.

(21) Appl. No.: 09/623,592

(22) PCT Filed: Mar. 4, 1999

(86) PCT No.: PCT/IL99/00130

§ 371 (c)(1),
(2), (4) Date: Sep. 5, 2000

(87) PCT Pub. No.: WO99/45423

PCT Pub. Date: Sep. 10, 1999

(30) Foreign Application Priority Data

Mar. 6, 1998 (IL) .................................................. 123579

(51) Int. Cl.⁷ .................................................. G09F 9/30
(52) U.S. Cl. ........................... 345/108; 345/77; 345/84; 345/85; 40/582
(58) Field of Search ............................... 345/77, 84, 85, 345/108; 40/582

(56) References Cited

U.S. PATENT DOCUMENTS

| 4,288,788 A | 9/1981 | Rogers et al. |
|---|---|---|
| 5,636,052 A | 6/1997 | Arney et al. |
| 5,841,579 A | 11/1998 | Bloom et al. |
| 5,945,898 A | 8/1999 | Judy et al. |
| 6,009,648 A | * 1/2000 | Tijanic ........................ 40/449 |
| 6,034,807 A | * 3/2000 | Little et al. ................. 359/227 |

FOREIGN PATENT DOCUMENTS

| DE | 195 26 656 | 1/1997 |
|---|---|---|
| DE | 195 45 255 | 5/1997 |
| EP | 0 262 829 | 4/1988 |
| EP | 0 521 713 A1 | 1/1993 |
| EP | 0 740 180 | 10/1996 |

\* cited by examiner

Primary Examiner—Bipin Shalwala
Assistant Examiner—Vincent E. Kovalick
(74) Attorney, Agent, or Firm—Fenster & Company

(57) ABSTRACT

A visual display is provided comprising a plurality of pixels each of which comprises: a surface having an area less than one square millimiter comprising first and second regions having surface finishes; and a thin planar panel having first and second sides having surface finishes, wherein the panel is rotatably coupled to the surface so as to rotate between a first and a second position about an axis parallel to the surface; wherein the panel in the first position is positioned over the first region with its second side facing the first region and wherein in the second position the panel is positioned over the second region with its first side facing the second region.

70 Claims, 21 Drawing Sheets

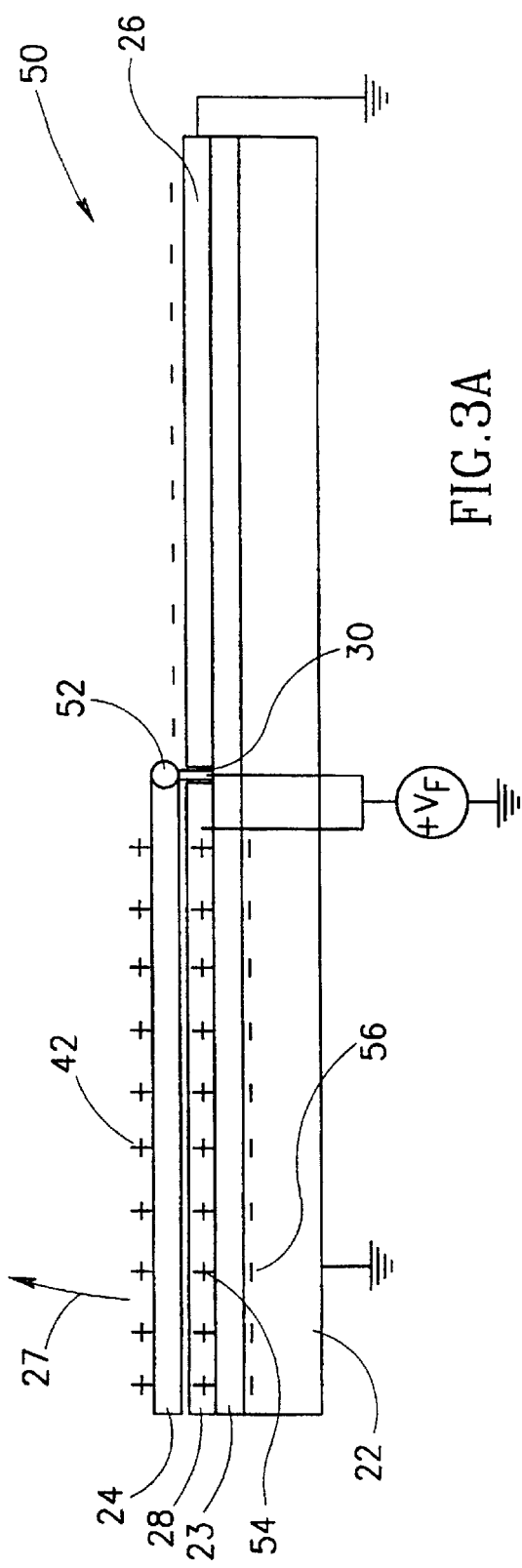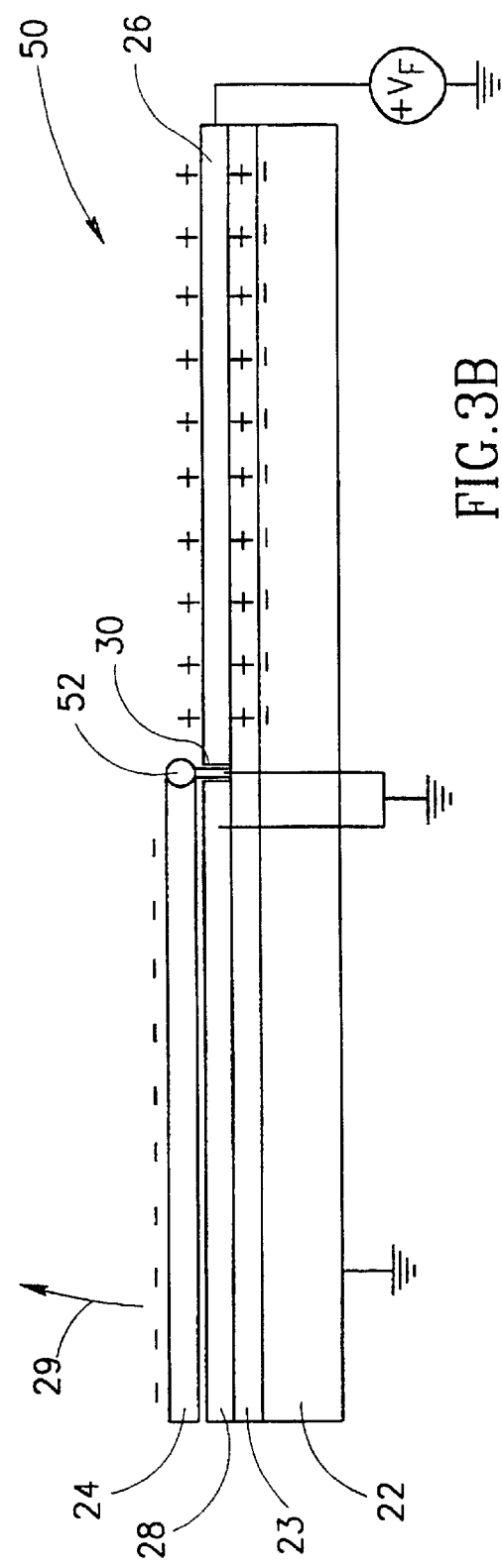

MICRO-MECHANICAL FLAT-PANEL DISPLAY

RELATED APPLICATIONS

The present application is U.S. national application of PCT/IL99/00130, filed Mar. 4, 1999

FIELD OF THE INVENTION

The invention relates to visual display systems and in particular to flat-panel displays produced using micro-machining techniques

BACKGROUND OF THE INVENTION

Flat-panel video displays are ubiquitous components of many consumer, industrial and military products and devices. They are found in computer laptops, automobile dashboards, microwave ovens and a myriad of other machines and devices with which man interacts.

Active-matrix liquid-crystal displays dominate the market for high quality high-resolution flat-panel displays. However, these displays are relatively expensive and the amount of power they consume when operating is relatively large in comparison to the amount of power readily available from many battery driven devices.

The need and desire to incorporate visual displays into more and more products, ranging from portable GPS baedekers to toys, has created a strong demand and expanding market for inexpensive flat-panel displays that can provide high quality images and operate with low power consumption.

In response to the demand, new types of flat panel displays have been developed based on the processing of silicon using MEMS technology. MEMS technology enables microstructures having features on the order of a few microns to be formed on appropriate silicon substrates. The technology can therefore be used to produce "pixel" sized devices, on silicon, that process light. Arrays of these devices are useable to form flat-panel displays that are potentially inexpensive, that operate with low energy consumption and provide high-quality images.

Most flat-panel displays produced using silicon technology belong to one of two general types. A flat-panel display of a first type has pixels each of which comprises a liquid crystal cell formed on a silicon substrate. Light, which may be ambient light or light from an appropriate light source, illuminates the pixels. Transmittance of the liquid crystal in each pixel for the light determines how bright the pixel appears. The transmittance of the liquid crystal is controlled by voltage on electrodes in the pixel. A pattern of pixels having varying levels of brightness is formed on the display to produce an image by controlling the voltage on the electrodes in each pixel of the display. Images provided by this type of display generally suffer from low brightness and low contrast.

A flat panel display, hereinafter referred to as a "micro-mechanical display", of a second type, has pixels each of which comprises at least one movable structure micro-machined on a silicon substrate. The position of the at least one moveable structure in each pixel controls how bright the pixel appears by controlling an amount of light that the pixel reflects or diffracts. Generally, the position of the at least one moveable element is controlled by electrostatic forces between the at least one moveable element and electrodes in the pixel that are generated by applying appropriate voltages to the electrodes. Often the voltages are relatively high and moving the at least one moveable element requires a relatively large expenditure of energy. Usually, in these types of displays, brightness and image contrast are dependent upon viewing angle, as measured with respect to the normal to the plane of the display, and decrease as the viewing angle increases. Some of these displays require an internal light source that consumes relatively large amounts of power when operating.

A micro-mechanical display in which the at least one moveable structure in pixels in the display comprises a plurality of parallel flexible reflecting ribbons is described in U.S. Pat. No. 5,841,579 to D. M. Bloom et al, which is incorporated herein by reference. The flexible ribbons in a pixel of the display are normally located parallel to the plane of the substrate on which the pixel is formed at a small distance above the plane. The ribbons are controllable to be depressed towards the substrate by electrostatic forces that are generated by voltages applied to electrodes in the pixel.

To form an image on the display, the pixels in the display are illuminated with light from a suitable light source so that light is incident on the pixels at a given angle with respect to the plane of the display. When alternate ribbons of the plurality of ribbons in a pixel are depressed, the plurality of ribbons in the pixel form a diffraction grating that diffracts some of the incident light at an angle such that the pixel appears bright to a user of the display. If alternate ribbons are not depressed, the plurality of ribbons in the pixel reflect the incident light at a different angle such that light from the pixel does not reach the eye of the user and the pixel appears dark. An appropriate pattern of bright and dark pixels forms the image on the display. The patent describes methods for using pixels of the type described to produce a flat-panel displays that provide color images.

Another type of micro-mechanical display is described in U.S. Pat. No. 5,636,052 to S. C. Arney et al, which is incorporated herein by reference. In this flat-panel display the at least one moveable element in a pixel is a membrane. The membrane is flexibly supported so that it is parallel to the substrate with a small air gap between the two. Light that is incident on the pixel is reflected by both the substrate and the membrane. The height of the air gap determines whether the reflected light from the membrane and the substrate interfere constructively or destructively and therefore if the pixel appears bright or dark respectively. An addressable electrode in the pixel, when charged attracts the membrane towards the substrate thereby controlling the height of the air gap and therefore whether the pixel is bright or dark. In order to displace the membrane, relatively high voltages, on the order of tens of volts, must be applied to the addressable electrode.

It would be advantageous to have a flat panel display that uses ambient light, without the need for a separate light source, and that can provide high quality high contrast images while operating at low voltages with low power consumption.

SUMMARY OF THE INVENTION

An aspect of some preferred embodiments of the present invention is related to providing a micro-mechanical flat-panel display that uses ambient light and provides high-contrast images at substantially all viewing angles with respect to the plane of the display.

An aspect of some preferred embodiments of the present invention is related to providing a flat-panel display that operates with low power consumption.

An aspect of some preferred embodiments of the present invention is related to providing a flat-panel display that operates using electrical power supplied at low voltages.

An aspect of some preferred embodiments of the present invention relates to providing a flat-panel display that provides black and white and/or gray level images.

An aspect of some preferred embodiments of the present invention relates to providing a flat-panel display that provides color images.

An aspect of some preferred embodiments of the present invention relates to providing a micro-mechanical flat-panel display formed on a substrate and having pixels that comprise a moveable element.

In a preferred embodiment of the invention, the moveable element is formed in the shape of a thin planar panel having first and second relatively large face surfaces and thin edges. The panel, hereinafter referred to as a "flipper", is hinged to the substrate in such a way that it is rotatable from one to the other of two limiting positions about an axis of rotation that is parallel to the surface of the substrate. The limiting positions are hereinafter referred to as "on" and "off" positions. The flipper is preferably at least partly formed from a conducting material.

In the on position the first face surface faces a user looking at the display and is visible to the user. The second face surface of the flipper faces the substrate, facing away from the user, and is not visible to the user. In the off position the second face surface faces the user and is visible the user while the first face surface faces the substrate. Preferably, in the on and off positions, the plane of the flipper is close to and substantially parallel to the surface of the substrate. Preferably, the flipper rotates through approximately 180° about the axis of rotation to rotate between on and off positions.

According to an aspect of some preferred embodiments of the present invention, rotation of the flipper is controllable so that the flipper is bistable. The flipper is either in the on position or in the off position and remains in one position until it is controlled to rotate to the other position. When the flipper is either in the on or off position the pixel consumes little or substantially no energy.

An aspect of some preferred embodiments of the present invention relates to providing addressable electrodes for each pixel in the substrate to which voltages are applied in different configurations so as to control rotation of the pixel's flipper. For some voltage configurations applied to the electrodes, electrostatic forces generated between the flipper and the electrodes prevent the flipper from rotating between on and off positions. In these voltage configurations, substantially no current flows in the pixel and therefore the pixel consumes little or no energy. In other voltage configurations, electrostatic forces between the flipper and the electrodes generate a torque that rotates the flipper from one to the other of the on and off positions.

According to another aspect of some preferred embodiments of the present invention, the first face surface of the flipper in a pixel has a first color and the second face surface of the flipper has a second color. In addition, substantially all surfaces in the pixel that are visible when the flipper is in the on position, in which position the first face surface of the flipper is visible, are colored to have the same color as the first face surface of the flipper. Similarly, substantially all surfaces in the pixel that are visible when the flipper is in the off position, in which position the second face surface of the flipper is visible, are colored to have the same color as the second face surface of the flipper. As a result when the flipper is in the on position the pixel appears to have the first color and when the flipper is in the off position the pixel appears to have the second color.

In some preferred embodiments of the present invention the first color is white and the second color is black. In these preferred embodiments of the present invention pixels in the display are white when the flipper is in the on position and black when the flipper is in the off position and the display provides black and white images.

In some preferred embodiments of the present invention in which the first color is white and the second color is black, gray level images are provided. A gray level for a pixel is achieved, in accordance with a preferred embodiment of the present invention, by switching the pixel's flipper between on and off positions so rapidly that the brain does not discern that the pixel is either black or white. Instead the brain perceives that the pixel is gray. The gray level perceived is determined by the ratio between the times that the flipper is in the on position and the off position.

In some preferred embodiments of the present invention gray level images are achieved by grouping pixels in a flat panel display into "super-pixels". A super pixel comprises a plurality of pixels, for example three pixels, each of which is contiguous with at least one other pixel in the super pixel. A super pixel is small enough so that the eye does not distinguish whether a single pixel in the super pixel is black or white. Instead the eye integrates the stimuli received form the pixels in the super pixel and perceives an average of the received stimuli which is a gray level. For example, a super pixel with three black and white pixels can provide four gray levels of luminance.

In other preferred embodiments of the present invention the first color of pixels in a super pixel is red (R), green (G) or blue (B) and the second color is black. Pixels in the super pixel are therefore R, G or B when their flipper is in an on position and black when their flipper is in an off position. Super pixels comprising "color" pixels are useable, in accordance with a preferred embodiment of the present invention to provide a color flat-panel display.

An aspect of some preferred embodiments of the present invention relates to providing a pixel, hereinafter referred to as a "multi-flipper pixel" that comprises at least two flippers. The axes about which flippers rotate between on and off positions are congruent or parallel and close to each other. The flippers are flipped back and forth between on and off positions and lie on each other in much the same way that pages in a book are flipped back and forth and lie on each other when the book is lying open on a table.

There is therefore provided in accordance with a preferred embodiment of the present invention a visual display comprising a plurality of pixels each of which comprises: a surface having an area less than 1 square millimeter comprising first and second regions having surface finishes; and a thin planar panel having first and second sides having surface finishes, wherein the panel is rotatably coupled to the surface so as to rotate between a first and a second position about an axis parallel to the surface; wherein the panel in the first position is positioned over the first region with its second side facing the first region and wherein in the second position the panel is positioned over the second region with its first side facing the second region.

Preferably when the panel is in the first position it obscures substantially all of the first region. Additionally or alternatively, when the panel is in the second position it preferably obscures substantially all of the second region.

In some preferred embodiments of the present invention the plurality of pixels is produced using micro-machining technology. The surface in some preferred embodiments of the present invention has an area less than 0.25 square millimeters. The surface in some preferred embodiments of the present invention has an area less than 5000 square microns. In some preferred embodiments of the present invention the surface has an area less than 2000 square microns.

According to some preferred embodiments of the present invention the first and second regions of the surface have first and second planar electrodes respectively. Preferably, at least one of the first and second electrodes has at least one non-conducting protuberance on its surface.

Additionally or alternatively, the panel is preferably formed from a conducting material. Preferably, at least one side of the panel has at least one non-conducting protuberance thereon. Additionally or alternatively, the first and second sides preferably have a non-conductive coating.

Alternatively or additionally, the panel is preferably rotated between first and second positions by electrostatic forces acting on the panel that are generated by applying voltages to the first and second electrodes and to the panel. Preferably, the panel is rotated from the first position to the second position by grounding the second electrode and applying a same voltage to the first electrode and the panel. Preferably, the panel is rotated from the second position to the first position by grounding the panel and the second electrode and applying a voltage to the first electrode. Alternatively or additionally, the panel is preferably rotated from the second position to the first position by applying a same voltage to the second electrode and the panel and grounding the first electrode.

In some preferred embodiments of the present invention, the panel is rapidly rotated between first and second positions in a time shorter than the response time of the eye so that the pixel appears to have a finish that is a mix between the finishes of the first side and the second region and the finishes of the second side and the first region.

In some preferred embodiments of the present invention the finish of the first region and the finish of the second side of the panel are the same. In some preferred embodiments of the present invention the finish of the second region and the finish of the first side of the panel are the same. In some preferred embodiments of the present invention the finish of the first region appears white. The finish of the first region displays a color that is a color of a tristimulus set of colors in some preferred embodiments of the present invention. The finish of the first region is luminescent in some preferred embodiments of the present invention. In some preferred embodiments of the present invention the finish of the second region displays a color of a tristimulus set of colors. The finish of the second region is luminescent in some preferred embodiments of the present invention. In some preferred embodiments of the present invention the finish of the second region appears black.

In some preferred embodiments of the present invention, at least one pixel of the plurality of pixels comprises at least one additional thin panel that has first and second sides having surface finishes and the at least one additional panel is rotatably coupled to the surface of the at least one pixel so as to rotate between first and second positions about an axis that is parallel to the surface.

Preferably, all the axes about which panels of the at least one pixel rotate are substantially coincident. Additionally or alternatively, panels of the at least one pixel that are in the first position are preferably positioned one over the other in a stack over the first region with their second sides facing the first region and panels in the second position are positioned one over the other in a stack over the second region with their first sides facing the second region. Preferably, a top-most panel in a stack of panels substantially obscures all panels below the top-most panel and the first region or the second region so that at any one time the at least one pixel displays only two of the surface finishes.

All panels of the at least one pixel are preferably formed from conducting material. Preferably, at least one side of at least one panel of the at least one pixel has at least one non-conducting protuberance thereon. Additionally or alternatively at least one side of at least one panel of the at least one pixel has a non-conducting coating.

Additionally or alternatively, panels of the at least one pixel are rotated between the first and second positions by electrostatic forces acting on the panels, the electrostatic forces being generated by applying voltages to the first and second electrodes and to panels of the at least one pixel.

Preferably, a topmost panel in a stack of panels in the first position is rotated to a second position with all panels in the first position and the first electrode grounded. Preferably when there is at least one panel in the second position, a voltage is applied to a topmost panel in the second position and the second electrode is grounded to rotate the topmost panel in the first position. When there are no panels in the second position preferably a voltage is applied to the second electrode to rotate the topmost panel in the first position.

Additionally or alternatively, a topmost panel in a stack of panels in the second position is rotated to a first position with all panels in the second position and the second electrode grounded. Preferably, when there is at least one panel in the first position, a voltage is applied to a topmost panel in the first position and the first electrode is grounded to rotate the topmost panel in the second position. Preferably, when there are no panels in the first position a voltage is applied to the first electrode to rotate the topmost panel in the second position.

Alternatively or additionally, a topmost panel of at least one panel in the second position is rotated to a first position by grounding the first electrode and applying a first voltage to the topmost panel in the second position. Preferably, when there is at least one panel in the first position a second voltage is applied to a topmost panel of the at least one panel in the first position and all other panels in the first position are grounded and wherein the second voltage is different from the first voltage. Additionally or alternatively, when there is at least one panel beneath the topmost panel in the second position, the first voltage is applied to a panel immediately below the topmost panel in the second position and all other panels in the second position and the second electrode are grounded. Alternatively or additionally, when there are no panels below the topmost panel in the second position the first voltage is applied to the second electrode.

In some preferred embodiments of the present invention, when at least one panel of the at least one pixel is in the first position and at least one panel is in the second position, the first side of a topmost panel in the first position and the second side of a topmost panel in the second position have a same finish. Preferably, the first region and the second side of a topmost panel in the second position have a same finish when all of panels of the at least one pixel are in the second position. Preferably, the second region and the first side of a topmost panel in the first position have a same finish when all panels of the at least one pixel are in the first position. Preferably, no two same finishes display a same color.

In some preferred embodiments of the present invention each of the same finishes displays a different gray level.

In some preferred embodiments of the present invention at least one of the same finishes is luminescent.

In some preferred embodiments of the present invention the at least one pixel comprises two panels. Preferably, each of the same finishes is a different color of a tristimulus set of colors.

In some preferred embodiments of the present invention a tristimulus set of colors is RGB.

In some preferred embodiments of the present invention, at least one panel of at least one pixel of the plurality of pixels is formed with at least one through hole near an edge thereof. Preferably, the at least one pixel comprises at least one bracket fastened to the surface, the at least one bracket having a U-shaped member having legs wherein, the U-shaped member passes through one of the at least one through hole so as to rotatably mount the at least one panel to the surface.

Preferably, the at least one panel is formed with at least one slot in the edge that joins with one of the at least one through hole through which a U-shaped member passes. Preferably the bracket of the U-shaped member that passes through a through hole joining with a slot comprises a septum that is positioned in the slot and wherein the septum limits motion of the at least one panel parallel to the edge.

In some preferred embodiments of the present invention at least one panel of at least one pixel of the plurality of pixels is formed with a protuberance at both ends of a single edge thereof. Preferably, the at least one pixel comprises two brackets fastened to the surface of the pixel, wherein each bracket comprises a U-shaped member having two legs wherein the U-shaped member of each bracket loops around a different one of the protuberances so as to rotatably mount the at least one panel to the surface. Preferably, at least one of the brackets has a surface that presses against an end of one of the protuberances wherein the surface limits motion of the at least one panel parallel to the single edge.

Additionally or alternatively the at least one panel is formed with clearance slots that enable the at least one panel to rotate from the first position to the second position without the at least one panel making physical contact with a bracket that couples a different one of the at least one panel to the surface.

Alternatively or additionally at least one of the brackets is preferably fastened to the surface of the at least one pixel at a single localized region of the bracket that is located near to one of the legs. Alternatively or additionally at least one of the brackets is preferably fastened to the surface of the at least one pixel at two localized regions of the bracket wherein each of the localized regions is located near to a different one of the legs.

Alternatively or additionally at least one of the brackets that couples the at least one panel to the surface of the at least one pixel is preferably formed from a conducting material. Preferably, the surface of the at least one pixel comprises at least one electrode in addition to the first and second electrodes. Preferably, the at least one bracket formed from the conducting material is fastened to one of the at least one additional electrodes. Preferably, when regions of the at least one panel are in physical contact with the electrode or the conducting bracket, the panel is in electrical contact with the electrode. Preferably, voltage is applied to the panel by applying voltage to the electrode.

In some preferred embodiments of the present invention, the first and second regions of the surface of at least one pixel of the plurality of pixels are planar and wherein an angle between the plane of the first region and the plane of the second region is less than 180°. Preferably, the angle is greater than 140°. More preferably the angle is greater than 160°.

There is further provided in accordance with a preferred embodiment of the present invention a micro-machined bracket for mounting a shaft to a surface so that the shaft is rotatable comprising: a U-shaped member having two legs connected by a bridging element; and a base member attached to one of the legs; wherein the base member is attached to the surface and the shaft is captured between the surface and the legs and bridging element of the U-shaped member.

There is further provided in accordance with a preferred embodiment of the present invention a micro-machined bracket for mounting an element comprising two collinear shafts to a surface so that the element is rotatable about the shafts and wherein the shafts are separated by a space, the bracket comprising: a U-shaped member having two legs connected by a bridging element; a base member attached to one of the legs; and a septum; wherein one of the base member is attached to the surface and the shaft is captured between the surface and the legs and bridging element of the U-shaped member and wherein the septum is located in the space between the shafts.

BRIEF DESCRIPTION OF FIGURES

The invention will be more clearly understood by reference to the following description of preferred embodiments thereof read in conjunction with the figures attached hereto. In the figures, identical structures, elements or parts which appear in more than one figure are labeled with the same numeral in all the figures in which they appear. The figures are:

FIGS. 3A and 3B show schematic side views of a variation of the pixel shown in FIGS. 1A–1C, in accordance with a preferred embodiment of the present invention, in which the structure of the pixel has been simplified in order to illustrate how electrostatic forces control movement and position of the flipper;

DETAILED DESCRIPTION OF PREFERRED EMBODIMENTS

Figure 1A:
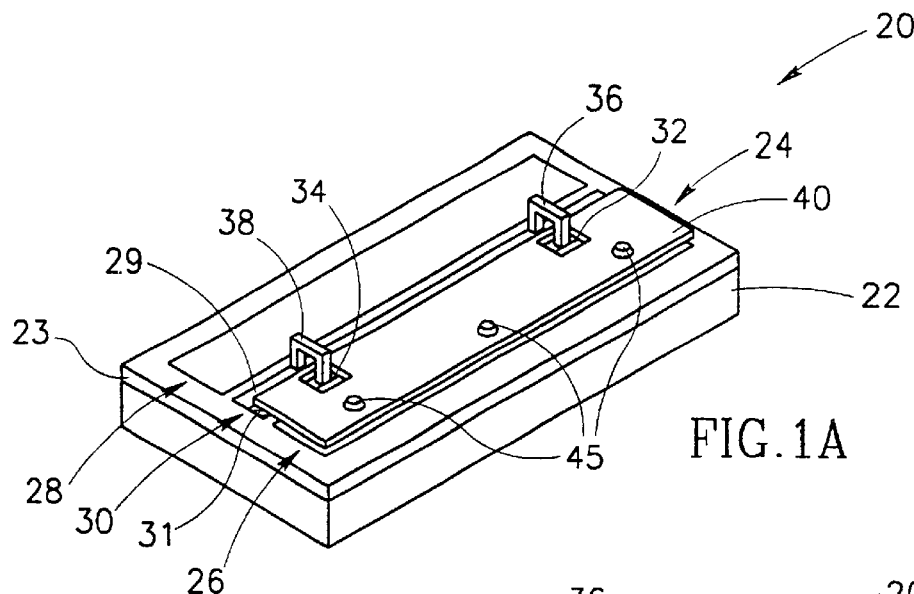
FIGS. 1A–1C show schematic perspective views of a micro-machined pixel with a flipper in three different positions, in accordance with a preferred embodiment of the present invention.
Figure 1B:
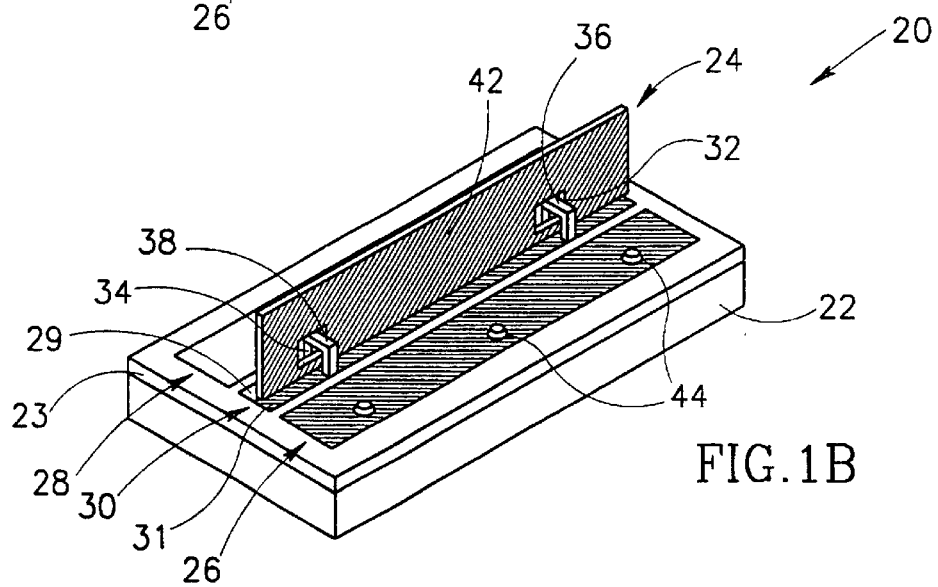
Figure 1C:
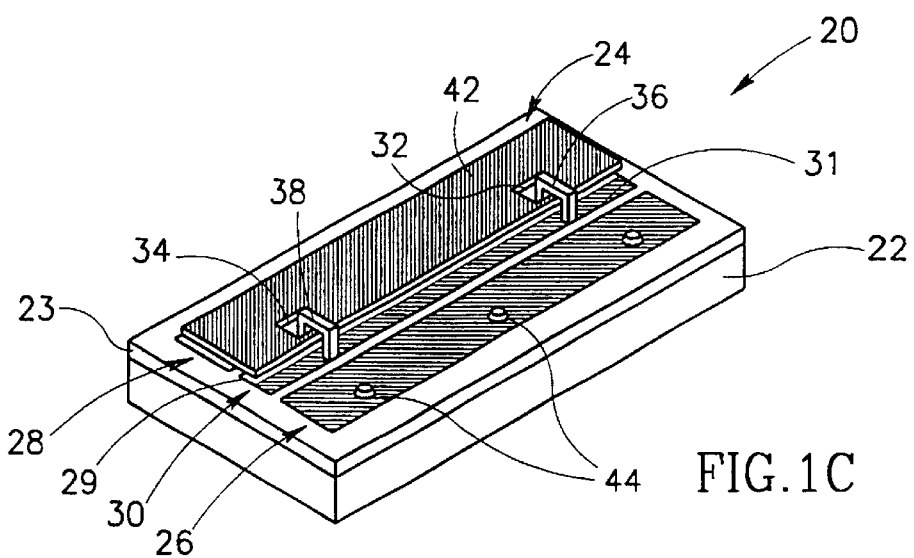

FIGS. 1A–1C show schematic perspective views of a pixel 20 for use in a micro-mechanical display, in accordance with a preferred embodiment of the present invention. Components and elements of pixel 20 shown in FIGS. 1A–1C and in the other figures are not necessarily to scale and relative dimensions in the figures have been chosen for convenience and clarity of presentation.

Pixel 20 is preferably formed on a silicon substrate 22 using micro-machining techniques. In accordance with a preferred embodiment of the present invention, pixel 20 comprises a flipper 24, first and second side electrodes 26 and 28 respectively and a central electrode 30. Preferably, a thin layer 23 of insulating material separates electrodes 26, 28 and 30 from substrate 22. Preferably, a thin planar region of substrate 22 that is contiguous with insulating layer 23 is a good conductor. In FIG. 1A flipper 24 is in an on position and in FIG. 1C flipper 24 is in an off position. In FIG. 1B, flipper 24 is shown in a position intermediate the on and off positions. Flipper 24 is preferably formed in the shape of a thin rectangular planar panel having two relatively large surfaces, a first face surface 40 shown in FIG. 1A and a second face surface 42 shown in FIGS. 1B and 1C. Flipper 24 is preferably formed with mounting holes 32 and 34. U brackets 36 and 38 loop through mounting holes 32 and 34 respectively and loosely bracket flipper 24 to central electrode 30 so that flipper 24 is rotatable back and forth between the on and off positions of flipper 24.

For a black and white and/or gray level flat-panel display, in accordance with a preferred embodiment of the present invention, first face surface 40 (FIG. 1A) is preferably treated so that it is white. Second face surface 42 (FIGS. 1B and 1C) is preferably treated so that it is black. First electrode 26 is preferably treated so that its surface is black and second electrode 28 is preferably treated so that its surface is white. Preferably, a portion 29 (FIG. 1A) of the surface of central electrode 30 that is visible when flipper 24 is in the on position is treated so that it is white. Preferably, a portion 31 of central electrode 30 that is visible when flipper 24 is in the off position (FIG. 1C) is treated so that it is black. Black colored surfaces are shown shaded and white colored surfaces are shown without shading.

When flipper 24 is in the on position shown in FIG 1A, flipper 24 covers substantially completely first electrode 26 and portion 31 (FIG. 1C) of electrode 30 that are black. Substantially all surfaces in pixel 20 that are visible are white and pixel 20 appears white. With flipper 24 in the off position shown in FIG. 1C, flipper 24 substantially completely covers electrode 28 and portion 29 (FIG. 1A) of central electrode 30 that are white. As a result, substantially all surfaces in pixel 20 that are visible are black and the pixel therefore appears black.

It should be noted that regions and elements of pixel 20 that are described as being treated to be black or white can be treated to display colors other than black or white. In particular, for example, regions and elements of pixel 20 that are white can be treated to have a color that is one of the primary RGB colors. Pixel 20 in the on position will therefore display one of the RGB colors accordingly and in the off position the pixel 20 will be black. Pixels 20 treated to have different ones of the RGB colors are useable, in accordance with a preferred embodiment of the present invention, to provide a color flat-panel display.

Motion of flipper 24 between on and off positions is controlled, in accordance with a preferred embodiment of the present invention, by electrostatic forces between flipper 24 and first and second electrodes 26 and 28.

In order to generate and control these electrostatic forces, preferably flipper 24 and U brackets 36 and 38 are made from a conducting material such as polysilicon or aluminum. Preferably flipper 24 is in conductive electrical contact with central electrode 30 and/or U brackets 36 and 38. As a result, voltage on flipper 24 is always substantially equal to voltage applied to central electrode 30. Preferably, conductive electrical contact between flipper 24 and electrode 30 is achieved as a result of physical contact between regions of flipper 24 and regions of electrode 30 and U brackets 36 and 38.

In addition, flipper 24 is preferably substantially isolated from conductive electrical contact with first and second electrodes 26 and 28. Preferably, conductive electrical contact between flipper 24 and first electrode 26 is prevented when flipper 24 is in the on position respectively by providing first electrode 26 with insulation nubs 44. Insulation nubs 44 on first electrode 26 are shown in FIGS. 1B and 1C. Preferably, conductive electrical contact between flipper 24 and second electrode 28 is prevented when flipper 24 is in the off position by providing flipper 24 with insulation nubs 45 on face surface 40 shown in FIG. 1A. Preferably, insulation nubs 44 and 45 are formed from a material that is a poor conductor. In some preferred embodiments of the present invention an insulating coating is used to cover insulation nubs 44 to make them non-conductive. Insulation nubs 44 and 45 not only prevent electrical contact between flipper 24 and electrodes 26 and 28 respectively, they also reduce stiction forces between flipper 24 and electrodes 26 and 28.

Insulation nubs 44 and 45 prevent direct physical contact between flipper 24 and first and second electrodes 26 and 28. When flipper 24 is in the on position (FIG. 1A), flipper 24 rests on insulation nubs 44 of electrode 26 and does not make direct contact with first electrode 26. Because insulation nubs 44 are poor conductors, flipper 24 is substantially electrically isolated from first electrode 26. Little or no current flows between flipper 24 and electrode 26 even if a potential difference exists between electrode 26 and electrode 28. Similarly, when flipper 24 is in the off position (FIG. 1C), flipper 24 rests on insulation nubs 45 on face surface 40 of flipper 24 and flipper 24 is substantially electrically isolated from second electrode 28.

FIGS. 2A–2D illustrate schematically how electrostatic forces generated by applying voltages to electrodes 26, 28 and 30 control movement of flipper 24, in accordance with a preferred embodiment of the present invention. In FIGS. 2A–2D views of pixel 20 are shown in profile facing the short edge of flipper 24. In the preferred embodiment shown in FIGS. 2A–2D the conducting layer of substrate 22 that is contiguous with insulating layer 23 is grounded. This is indicated in FIGS. 2A–2D and in other figures that follow, by showing substrate 22 as grounded. The conducting layer acts as a ground plane for pixel 20.

Figure 2A:
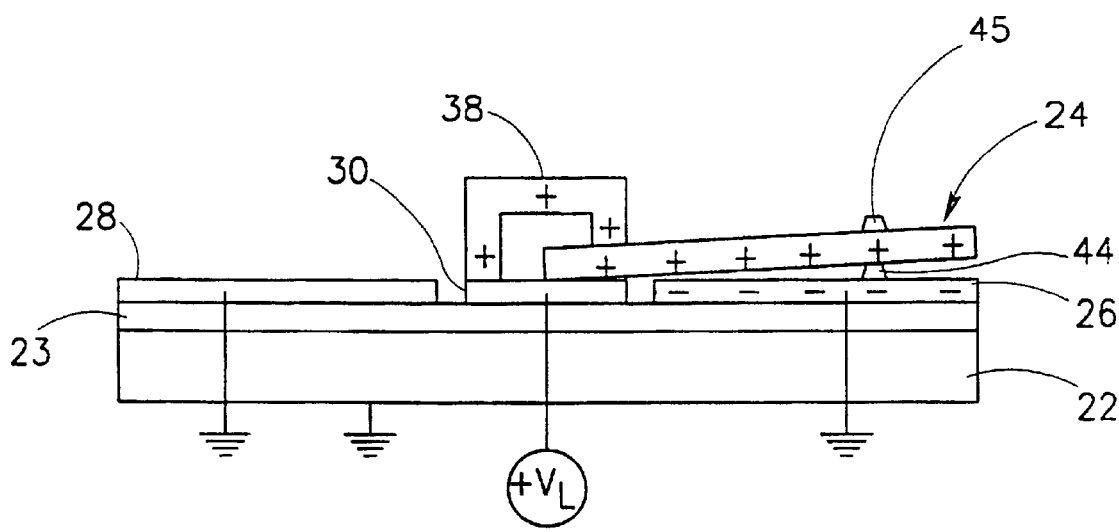
FIGS. 2A–2D show schematic side views of the pixel shown in FIGS. 1A–1C and illustrate how electrostatic forces control movement and position of the flipper, in accordance with a preferred embodiment of the present invention.

FIG. 2A shows pixel 20 with flipper 24 in the on position corresponding to the position of flipper 24 shown in FIG. 1A, in which pixel 20 is white. In the on position flipper 24 rests on central electrode 30 and insulation nubs 44, only one of which is shown, of first electrode 26. In FIG. 2A central electrode 30 is shown charged to a positive voltage "+$V_L$" and electrodes 26 and 28 are grounded. (The choice of sign for the voltage is arbitrary and a positive voltage is assumed for convenience.) Because flipper 24 is in contact with central electrode 30, flipper 24 is also at +$V_L$. As a result, flipper 24 has a net positive charge distribution indicated schematically in FIG. 2A by plus signs. The positive charges on flipper 24 induce negative charges, shown schematically by minus signs, on first electrode 26. Electrostatic attraction between the positive and negative charges prevents flipper 24 from moving away from first electrode 26 and flipper 24 is locked in the on position. Since insulation nubs 44 are substantially non-conducting, substantially no current flows between central electrode 30 and first electrode 26 through flipper 24. As a result, with flipper 24 locked in the on position substantially no energy is dissipated in pixel 20.

It should be noted that whereas in FIG. 2A first electrode 26 is shown grounded, first electrode 26 does not necessarily have to be grounded for an attractive electrostatic force to exist between flipper 24 and first electrode 26. As long as there is a potential difference between flipper 24 and electrode 26 there is an attractive force between them. In accordance with a preferred embodiment of the present invention, voltages other than those shown in FIG. 2A, can be used to lock flipper 24 in the on position if they provide required voltage differences between the electrodes and the flipper.

Flipper 24 is locked in the off position, corresponding to FIG. 1C in which pixel 20 is black, in similar manner to the way that flipper 24 is locked in the on position. Preferably second electrode 28 is grounded and central electrode 30 to voltage +$V_L$. A voltage +$V_L$ applied to central electrode 30 to lock flipper 24 in an on or off position is hereinafter referred to as a "locking voltage".

In accordance with a preferred embodiment of the present invention, flipper 24 is "unlocked" from the on position and flipped to the off position by applying a same voltage to central electrode 30 and first electrode 26 and grounding electrode 28. Charges on electrodes 26 and 30 and on flipper 24 (as a result of being in contact with electrode 30) resulting from the applied voltages induce charges on electrode 28 that are opposite in sign to the charges on electrodes 26, 30 and flipper 24. The charges on electrodes 26, 28 and 30 and flipper 24 generate electrostatic forces that operate to lift flipper 24 away from first electrode 26 and flip it to second electrode 28. The voltage applied to central electrode 30 and first electrode 26 is chosen large enough so that the electrostatic forces are strong enough to overcome stiction and the force of gravity acting on the mass of flipper 24.

Figure 2B:
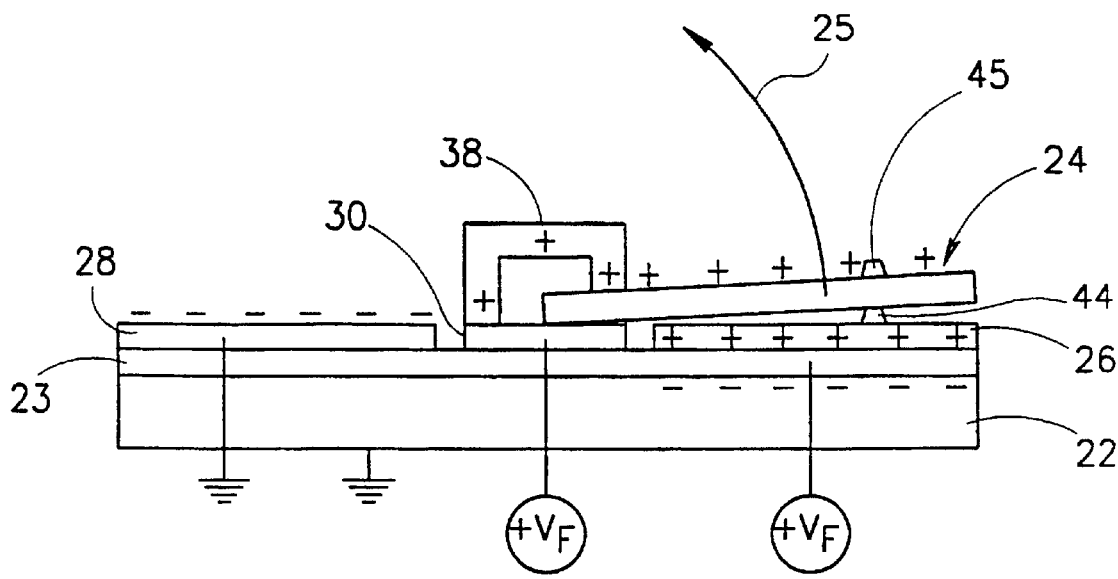

FIG. 2B schematically shows charge distributions on central electrode 30 and first electrode 26 in which both central electrode 30 and first electrode 26 are raised to a same positive potential +$V_F$ (chosen positive for convenience) in order to flip flipper 24 from the on position to the off position. The positive charges on central electrode 30, first electrode 26 and flipper 24 induce negative charge on second electrode 28. An electrostatic field that results from the positive and negative charges generates a force that acts on flipper 24 in a direction indicated by arrow 25. Force 25 lifts flipper 24 away from first electrode 24 and rotates flipper 24 away from first electrode 24 towards second electrode 28, so that flipper 24 flips to the off position.

Figure 2C:
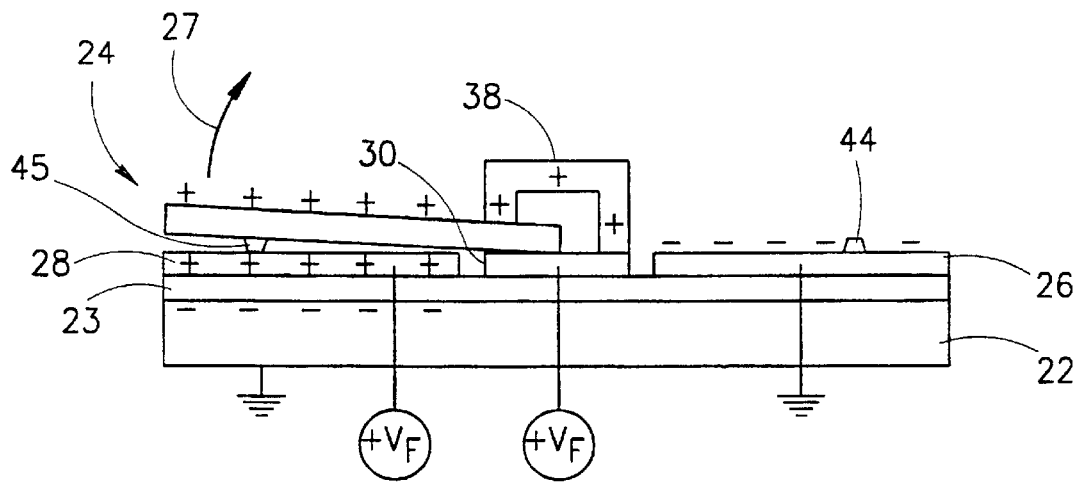

Flipper 24 may be similarly flipped from the off position back to the on position, in accordance with a preferred embodiment of the present invention, by applying voltage +$V_F$ to central electrode 30 and second electrode 28. This is schematically illustrated in FIG. 2C in which positive charge distributions are produced on flipper 24 and second electrode 28 by the application of +$V_F$ to central electrode 30 and second electrode 28. The positive charge distributions induce a negative charge distribution on first electrode 26. An electrostatic field that results from the charge distributions generates a force on flipper 24 in a direction indicated by arrow 27.

Figure 2D:
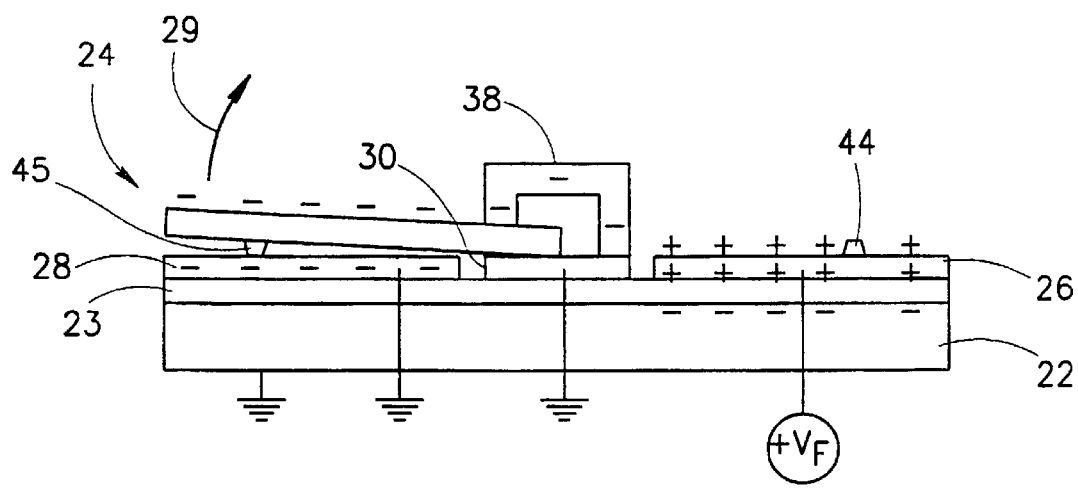

FIG. 2D shows schematically an alternate way of flipping flipper 24 between on and off positions, in accordance with a preferred embodiment of the present invention. In FIG. 2D flipper 24 is shown in the off position with central electrode 30 and second electrode 28 grounded. First electrode 26 is charged to a positive potential $V_F$. A resultant positive charge distribution on first electrode 26 induces a negative charge distribution on flipper 24 and on second electrode 28. The positive and negative charge distributions generate a net force on flipper 24 that operates in a direction indicated by arrow 29 to lift flipper 24 away from second electrode 28 and rotate flipper 24 towards first electrode 26.

The present inventors have simulated electrostatic fields generated by voltages applied to electrodes 26, 28 and 30 of pixel 20 in the configurations shown in FIGS. 2C and 2D on a computer using the ANSYS finite elements analysis program. Forces 27 and 29 shown respectively in FIGS. 2C and 2D were determined from the simulated electrostatic fields. The inventors found that force 27 is equal to force 29 if the magnitude of $V_F$ is the same in both cases. For the same voltage $V_F$, the method of flipping flipper 24 shown in FIG. 2C and the method for flipping flipper 24 shown in FIG. 2D generate a same "flipping force". A voltage $V_F$ used to flip flipper 24 between on and off positions is hereinafter referred to as a "flipping voltage".

The equivalence of the FIG. 2C and 2D methods of flipping flipper 24 may be understood from consideration of a pixel 50 shown in FIGS. 3A and 3B, which is an "idealized" version of pixel 20. FIGS. 3A and 3B show pixel 50 in a side view equivalent to the side view of pixel 20 shown in FIGS. 2A–2D. In both FIGS. 3A and 3B flipper 24 is in the off position.

Pixel 50 comprises substantially the same components as pixel 20. In pixel 50 however, insulation nubs 44 and 45 are omitted. Central electrode 30 has been "shrunk" to an electrical contact point 30 used for connecting flipper 24 to a power source. U brackets 36 and 38 are replaced by hinges 52, only one of which is shown in the perspective of FIGS. 3A and 3B, that enable flipper 24 to flip back and forth between on and off positions.

First and second electrodes 26 and 28 and flipper 24 are substantially the same size. Flipper 24 is assumed to be coated with an insulating coating (not shown) that substantially isolates flipper 24 from first and second electrodes when flipper 24 is in the on and off positions respectively. Substrate 22 is grounded so that the conducting layer of substrate 22 that is contiguous with insulating layer 23 functions as a ground plane of pixel 50.

In FIG. 3A, flipper 24 and second electrode 28 are both raised to a positive voltage +$V_F$ (positive for convenience of presentation only) and first electrode 26 is grounded. The voltage configuration shown in FIG. 3A is the same as the voltage configuration of electrodes, 26, 28 and 30 and flipper 24 of pixel 20 shown in FIG. 2C. In FIG. 3B, flipper 24 and second electrode 28 are grounded and first electrode 26 is raised to $V_F$. The voltage configuration shown in FIG. 3B is the same as the voltage configuration of electrodes, 26, 28 and 30 and flipper 24 of pixel 20 shown in FIG. 2D. Plus and minus charge distributions on electrodes 26, 28, 30, flipper 24 and on the boundary between insulating layer 23 and substrate 22 of pixel 50 are shown schematically by plus and minus signs.

Referring to FIG. 3A, as a result of raising second electrode 28 and flipper 24 to voltage $V_F$ positive charge is deposited on second electrode 28 and on flipper 24. Since second electrode 28 and flipper 24 are conductors and electrically connected together by their being connected to a same voltage, first electrode 28 and flipper 24 may be considered to function as a single conductor. As a result, none of the deposited positive charge resides (in the idealized geometry of pixel 50) at the boundary between second electrode 28 and flipper 24. The charge resides, as shown in FIG. 3A, on the outside surfaces of the volume of the "single conductor" formed by second electrode 28 and flipper 24. The positive charge in second electrode 28 is concentrated at a boundary region 54 between second electrode 28 and insulating layer 23. The positive charge in flipper 24 is concentrated on face surface 42 (only an edge of which is shown in the perspective of FIG. 3A) of flipper 24.

The positive charge in second electrode 28 induces a negative charge in the conducting layer of substrate 22. The negative charge in substrate 22 is concentrated at a boundary region 56 between substrate 22 and insulating layer 23. Except for edge effects, the electrostatic field generated by the charges at the boundary regions 54 and 56 of insulating layer 23 is confined to a volume of insulating layer 23 between the charges and has little effect outside this volume. Second electrode 28, the conducting layer of substrate 22 and the region of insulating layer 23 between them function as a thin parallel plate condenser. The amount of positive charge on second electrode 28 can be estimated from the capacitance of the parallel plate condenser, which is determined by dimensions of second electrode 28 and insulating layer 23 and the dielectric constant of the material of insulating layer 23.

The positive charges on face surface 42 of flipper 24, and substantially only these charges (except for edge effects), induce negative charges on first electrode 26 since the charges at boundary regions 54 and 56 do not generate a field outside of insulating layer 23. As a result the amount and distribution of the positive and negative charges on flipper 24 and first electrode 26 depend substantially only on the shapes of first electrode 26 and flipper 24, and the potential difference $V_F$ between them. Therefore an electrostatic field in the space above flipper 24 and first electrode 26 is a function substantially only of the shapes and relative positions of first electrode 26 and flipper 24 and on $V_F$. It follows then that force 27 generated by the electrostatic field that operates to lift flipper 24 away from second electrode 28 and towards first electrode 26 is substantially only a function of the shapes and relative positions of first electrode 26 and flipper 24 and $V_F$.

A similar analysis of the charge distributions shown in FIG. 3B leads to a same conclusion as that reached for the charge distributions shown in FIG. 3A. An electrostatic field in the space above flipper 24 and first electrode 26 in FIG. 3B is a function substantially only of the shapes and relative positions of first electrode 26 and flipper 24 and on the voltage difference $V_F$ between them. Similarly, force 29 in FIG. 3B that operates to lift flipper 24 away from second electrode 28 and towards first electrode 26 is substantially only a function of the shapes and relative positions of first electrode 26 and flipper 24 and $V_F$.

The shapes and relative positions of first electrode 26 and flipper 24 are the same in FIGS. 3A and 3B. Except for being of opposite polarity, the potential difference between flipper 24 and first electrode 26 are the same. As a result, the electrostatic fields generated in the space above flipper 24 and first electrode 26 in FIGS. 3A and 3B are identical except for polarity. Therefore forces 27 and 29 in FIGS. 3A and 3B that act to lift flipper 24 away from second electrode 28 are identical. Applying the results of the analysis for the "ideal" pixel 50 to pixel 20 shown in FIGS. 2C and 2D leads to the conclusion that forces 27 and 29 and therefore the methods for flipping flipper 24 shown in FIGS. 2C and 2D respectively are substantially the same.

The deposited and induced charges on flipper 24, first electrode 26 and second electrode 28 in the various voltage configurations that are used to rotate flipper 24 between on and off states are generally concentrated close to the axis of rotation of flipper 24. Therefore, forces that act on flipper 24 are also concentrated near to the axis of rotation of flipper 24. As a result, most of the torque that rotates flipper 24 is generated by forces that act on relatively short lever arms. In addition, the strength of the forces are substantially proportional to inverse squares of distances between points on flipper 24 and points on electrode 26 or 28 to which flipper 24 is to be rotated.

A geometry in which first and second electrodes 26 and 28 are substantially coplanar, as shown in pixels 20 and 50, maximizes the concentration of charge near to the axis of rotation of flipper 24. In addition for a given distance between edges of first and second electrodes 26 and 28 that are close to the axis of rotation of flipper 24, a coplanar geometry for electrodes 26 and 28 maximizes distances between points on the two electrodes. As a result for a given flipping voltage and given distance between "close edges" of electrodes 26 and 28, flipping forces are minimized when electrodes 26 and 28 are coplanar.

Figure 4:
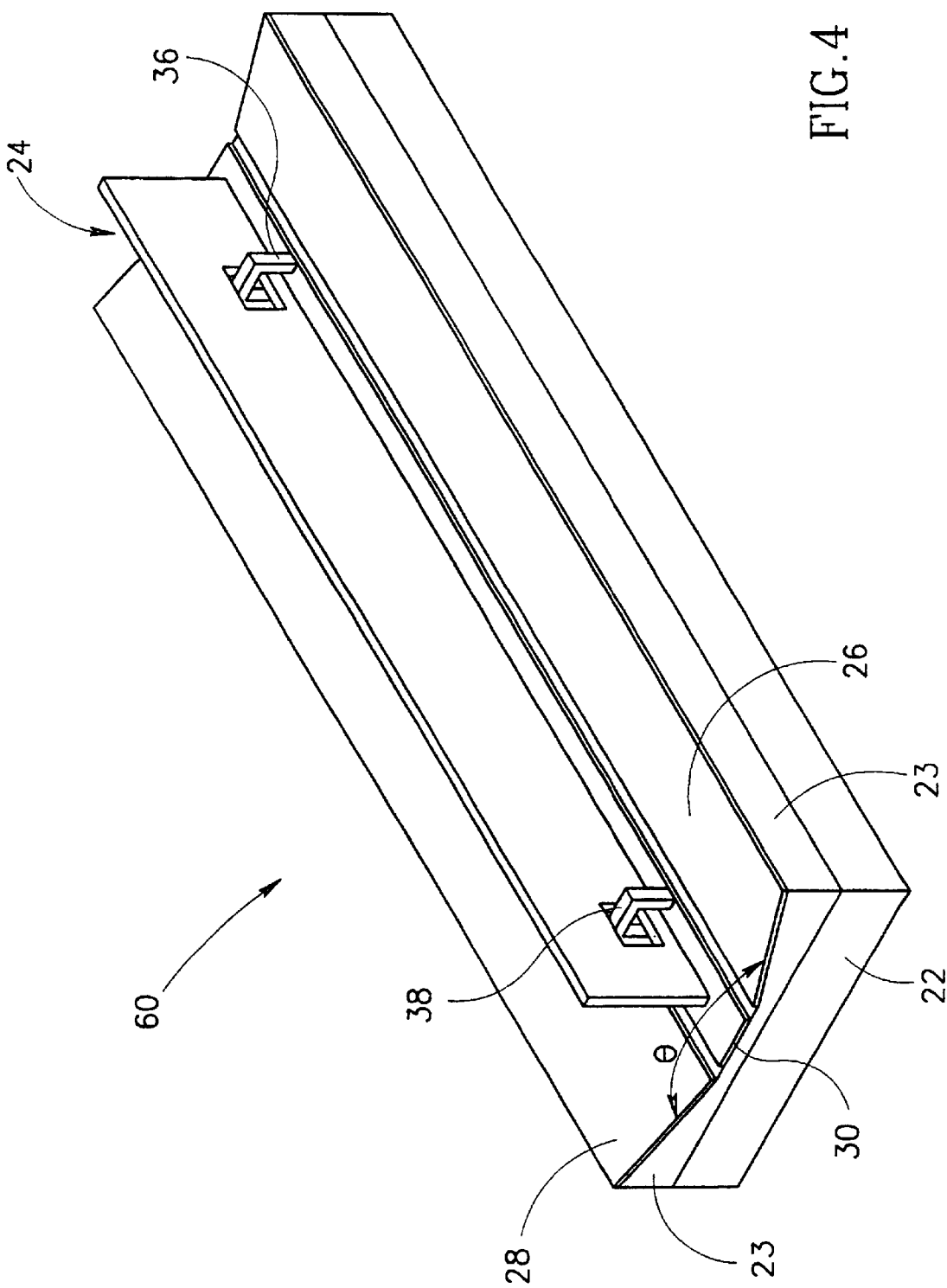
FIG. 4 shows schematically another pixel structure in accordance with a preferred embodiment of the present invention.

Therefore, in some preferred embodiments of the present invention, in order to increase flipping forces for a given flipping voltage, first and second electrodes 26 and 28 are angled so that the angle between their planes is less than 180°. FIG. 4 shows a pixel 60, in accordance with a preferred embodiment of the present invention, in which an angle θ between the planes of first and second electrodes 26 and 28 is less than 180°. Preferably, θ is between 140° and 180°. More preferably θ is between 150° and 180°.

The area of pixel 20, or other pixel in accordance with a preferred embodiment of the present invention, is preferably a square millimeter or less. Preferably flipper 24 is less than 1000 microns long and 500 microns wide. These dimensions provide a square pixel 1-mm on a side. For some applications flipper 24 is preferably less than 100 microns long and 50 microns wide, which provides a square pixel approximately 100 microns on a side. A pixel of this size is suitable for providing a black and white (two level) display having a resolution of 250 DPI.

In a preferred embodiment of the present invention flipper 24 is formed from polysilicon and has dimensions 1×14×83 microns, resulting in a pixel having dimensions approximately 28×83 microns. Electrodes 26, 28 and 30 are also preferably formed from polysilicon and are preferably 0.5 microns thick. Insulation nubs 44 and 45 are preferably about 1.5 microns high. For these dimensions and materials, the inventors have determined that flipper 24 can be flipped between on and off positions in a time on the order of 12 milliseconds using a flipping voltage substantially equal to five volts. A locking voltage of about 2.5 volts locks flipper 24 into an on or off position.

Pixels 20 that are 28×83 microns can be used, in accordance with a preferred embodiment of the present invention, to provide a black and white or gray level flat-panel display. A flat-panel display comprising pixels 20 of this size has a resolution of 300 DPI in a first dimension and approximately 900 DPI in a second dimension.

Alternatively, pixels 20 of this size can be used to provide a flat-panel color display, in accordance with a preferred embodiment of the present invention. For a flat-panel color display the areas of pixel 20 that are treated to be white in FIGS 1A–1C are treated to have one of the RGB colors. Each pixel of the flat-panel color display is a "super pixel", substantially square and approximately 83 microns on a side, comprising three pixels 20, each of which has a different RGB color.

It should be realized that although pixels 20 have been described as being white, black or one of the RGB primary colors, surfaces of pixels 20 can be treated to have other colors or finishes, in accordance with preferred embodiments of the present invention.

Figure 5:
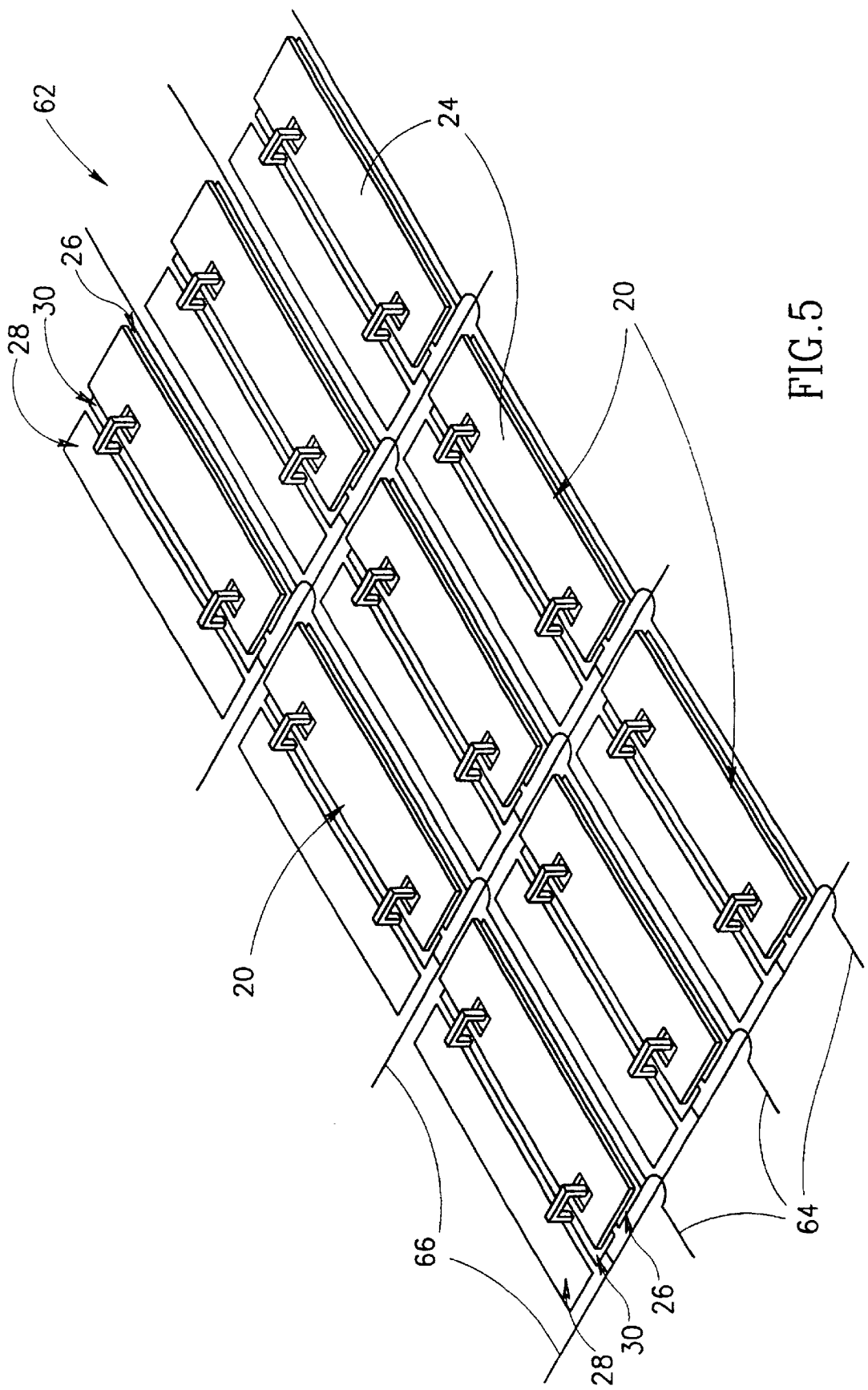
FIG. 5 shows schematically a portion of a flat-panel display comprising an array of pixels, in accordance with a preferred embodiment of the present invention.

FIG. 5 shows schematically part of a black and white flat-panel display 62 comprising a plurality of rectangular pixels 20, in accordance with a preferred embodiment of the present invention. In flat-panel display 62 the positions of flippers 24 in pixels 20 are controlled by row and column control lines 64 and 66 respectively. Each row control line 64 is connected to first electrode 26 of each pixel 20 in a row of pixels in flat-panel display 62. Each column control line 54 is connected to central electrode 30 in each pixel 20 in a column of pixels in flat-panel display 62. Second electrodes 28 in all pixels 20 are permanently grounded. (In a color flat-panel display comprising super pixels, each super pixel 64 would comprise three pixels 20 in a column of pixels shown in FIG. 5, so as to form a substantially square super pixel. Each one of the pixels 20 in a super pixel would display instead of white in the on position a different one of the RGB colors.)

In flat-panel display 62, a flipper 24 of a pixel 20 is flipped from on to off using the method described in the discussion of FIG. 2B in which both central electrode 30 and first electrode 26 are charged to a flipping voltage. Flipper 24 is flipped from off to on using the method described in the discussion of FIG. 2D, in which central electrode 30 is grounded and a flipping voltage is applied to first electrode 26. Flipper 24 is locked in an on position or an off position using the method shown in FIG. 2A in which central electrode 30 is charged to a locking voltage and first and second electrodes 26 and 28 are grounded. Hereinafter, setting flipper 24 of a pixel 20 to an on or off position is also referred to as setting or turning pixel 20 to on or off respectively.

To form an image on flat-panel display 62, pixels 20 are set to on or off, as required to form the image, row by row. Setting pixels 20 in a row to on or off begins with all row control lines 64 of flat panel display 62 grounded and all column control lines 66 of flat panel display 62 raised to a locking voltage. Column control lines 66 of pixels 20 in the row that are to be set to on are then grounded and column control lines 66 of pixels 20 in the row that are to be set to off are left at the flipping voltage. Row control line 64 of the row is then set to the flipping voltage. When this happens, all pixels 20 in the row are simultaneously set to their desired on or off states in a time, hereinafter referred to as a "flip time", that it takes a flipper 24 to flip between an on and off position. Flippers 24 of pixels 20 in the row that have their column control lines 66 set to zero remain in the on position if they are in the on position or flip to on if they are in the off position. Flippers 24 of pixels 20 in the row that have their column control lines 66 set to the flipping voltage stay in the off position if the are already in the off position or flip to the off position if they are in the on position. After pixels 20 in the row are set row control line 64 of the row is grounded.

Before continuing on to set pixels 20 in a next row in the same manner, all column control lines 66 in flat-panel display 62 are set to the locking voltage for a short period of time. This assures that all pixels 20 in other rows whose flippers 24 may have begun to dislodge from their respective on and off positions during the time that the row of pixels was being set, as a result for example of a vibration in flat-panel display 62, are safely returned to their positions. In this way pixels 20 in flat-panel display 62 are never left unlocked long enough for a pixel 20 to change its state unintentionally. (During the time that each row is being set some of the row control lines 66 are grounded leaving many pixels 20 unlocked.)

After all the pixels 20 in display 62 are properly set, all column control lines 66 are raised to the locking voltage to lock the pixels in the on and off states to which they have been set. The time it takes to form an image on flat panel display 62 is substantially equal to the number of rows in flat-panel display 62 times the flip time of the pixels in the flat-panel display.

In some flat-panel displays, in accordance with preferred embodiments of the present invention, an image is formed in a time that is much shorter than the time it takes to form an image in flat-panel display 62. The image is formed in a time substantially equal to the flip time of pixels 20 in the display rather than in a time substantially equal to a product of the flip time and the number of rows in the display.

This is achieved in a flat-panel display, in accordance with a preferred embodiment of the present invention, by providing each pixel 20 with addressable switches. The addressable switches are controllable to connect central electrode 30 and first electrode 26 of the pixel to ground or to a voltage output of a display power source independently of each other. In this way each pixel 20 is individually controllable and the setting of a pixel 20 to on or off in the display is uncoupled from the setting of other pixels in the display. The voltage output of the power supply is such that it can be set to ground or to appropriate locking and flipping voltages. When the voltage output is set to the locking or flipping voltage, the power source can substantially simultaneously charge electrodes 26 and 30 of all pixels 20 in the display to the locking or flipping voltage in a time substantially less than the flip time of the pixels.

To form an image on the flat-panel display, in accordance with a preferred embodiment of the present invention, the voltage output of the power supply is grounded. All the addressable switches in the display are addressed using an appropriate scanning procedure and controlled to connect first electrode 26 and central electrode 30 of pixels 20 to ground or to the power source. For pixels 20 that are to be set to on, central electrode 30 is connected to ground and first electrode 26 is connected to the output of the power source. For pixels 20 that are to be set to off, both central electrode 30 and first electrode 26 are connected to the voltage output. The voltage output is then raised to the flipping voltage, which causes all pixels 20 in the display to flip to their desired on or off state substantially simultaneously. First electrodes 26 of all pixels 20 are then connected to ground, all central electrodes of pixels 20 are connected to the voltage output and the voltage output is set to the locking voltage. This locks all pixels 20 in the on or off states to which they were set.

Scanning and setting the switches occur in a time that is very short compared to the flip time of pixels 20. As a result, the total time required to set and lock pixels 20 in their appropriate on or off states so as to form the image is substantially equal to the flip time of pixels 20.

Various configurations of power sources and switches in pixels 20 can be used to form a flat-panel display, in accordance with preferred embodiments of the present invention, in which pixels 20 are individually and/or simultaneously controllable to be switched on and off. These configurations will readily occur to persons of the art.

Preferably, an array of pixels 20 that are individually and/or simultaneously controllable, in accordance with a preferred embodiment of the present invention, is formed as a mono-block in a process that integrates layers of electronic and mechanical components to form a single unit.

In some preferred embodiments of the present invention a pixel comprises more than one flipper. Whereas a pixel that has a single flipper has two states, an on and off state, a pixel, in accordance with a preferred embodiment of the present invention, comprising a plurality of "N" flippers has (N+1) states. A multi-flipper pixel can therefore display a greater variety of colors than a pixel having a single flipper.

Figure 6A:
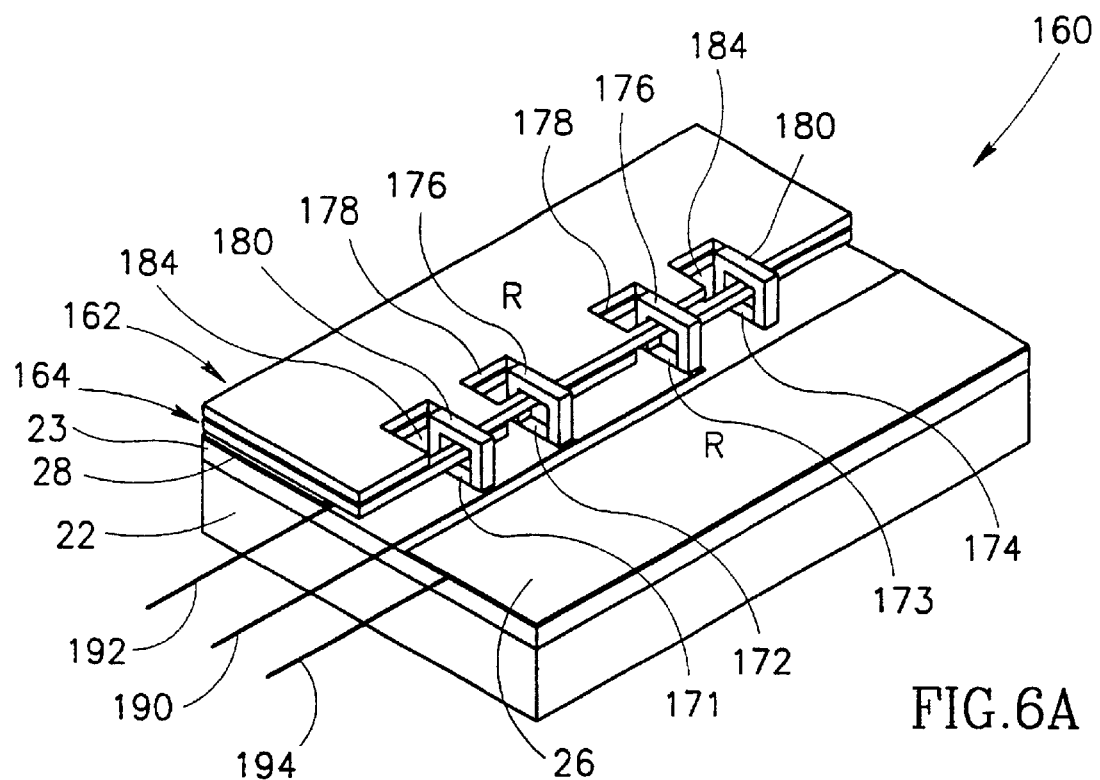
FIGS. 6A–6D show schematically construction and operation of a multi-flipper pixel in accordance with a preferred embodiment of the present invention.
Figure 6B:
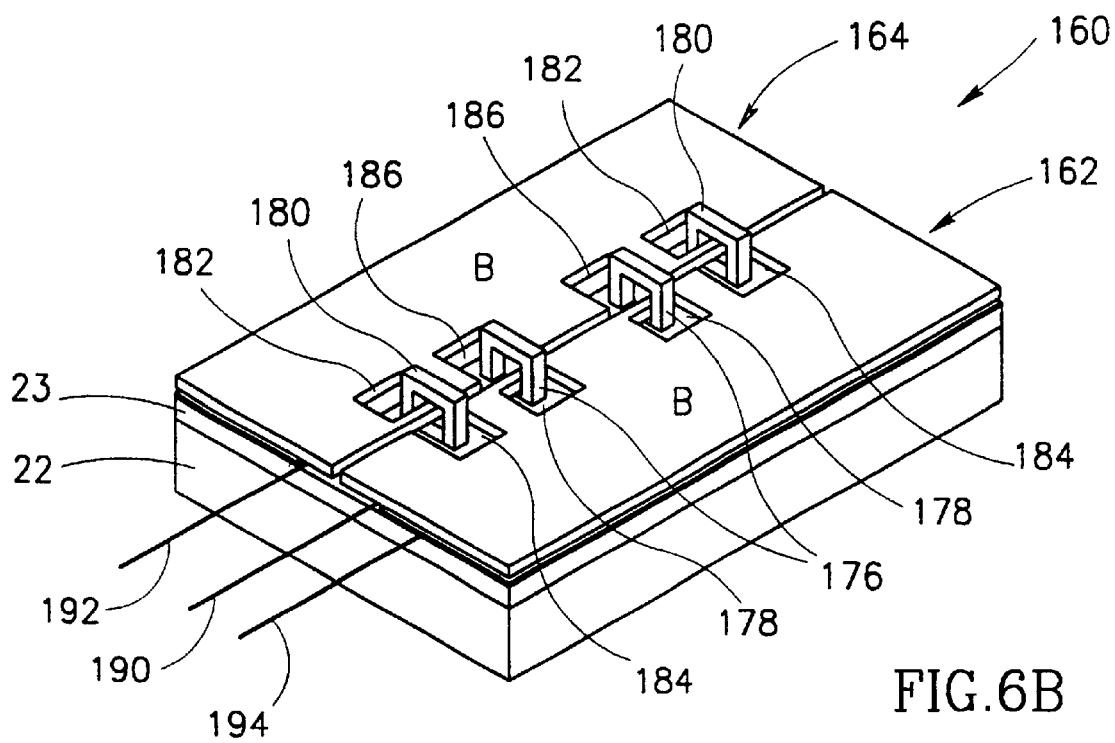
Figure 6C:
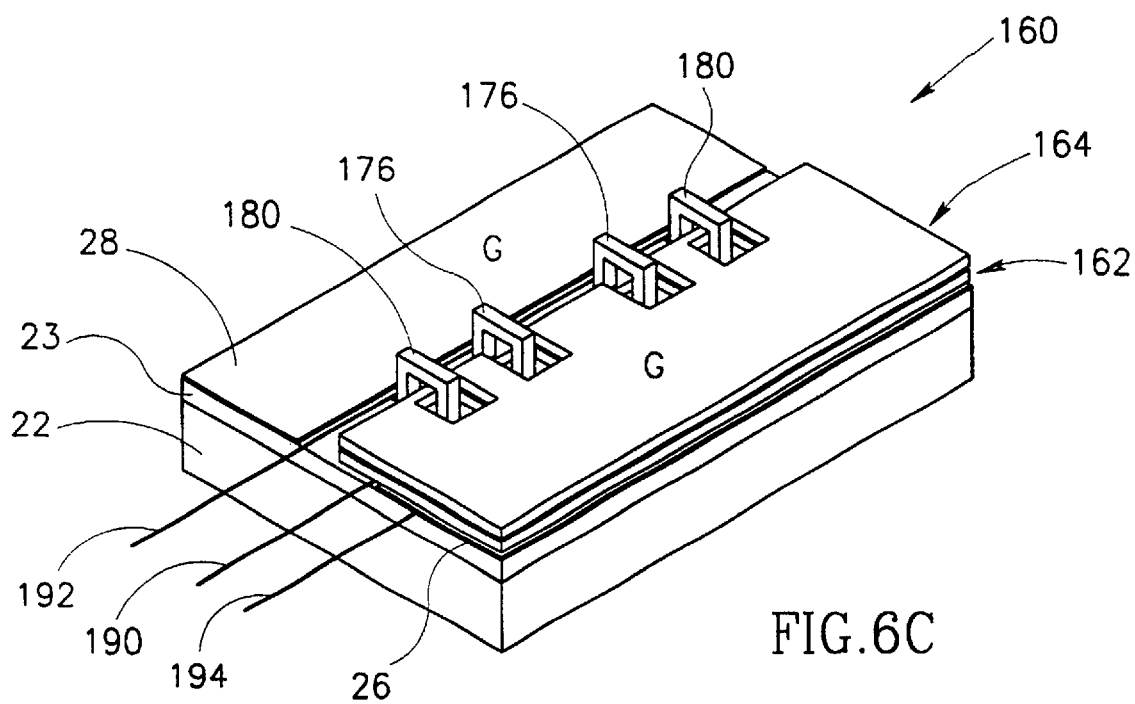
Figure 6D:
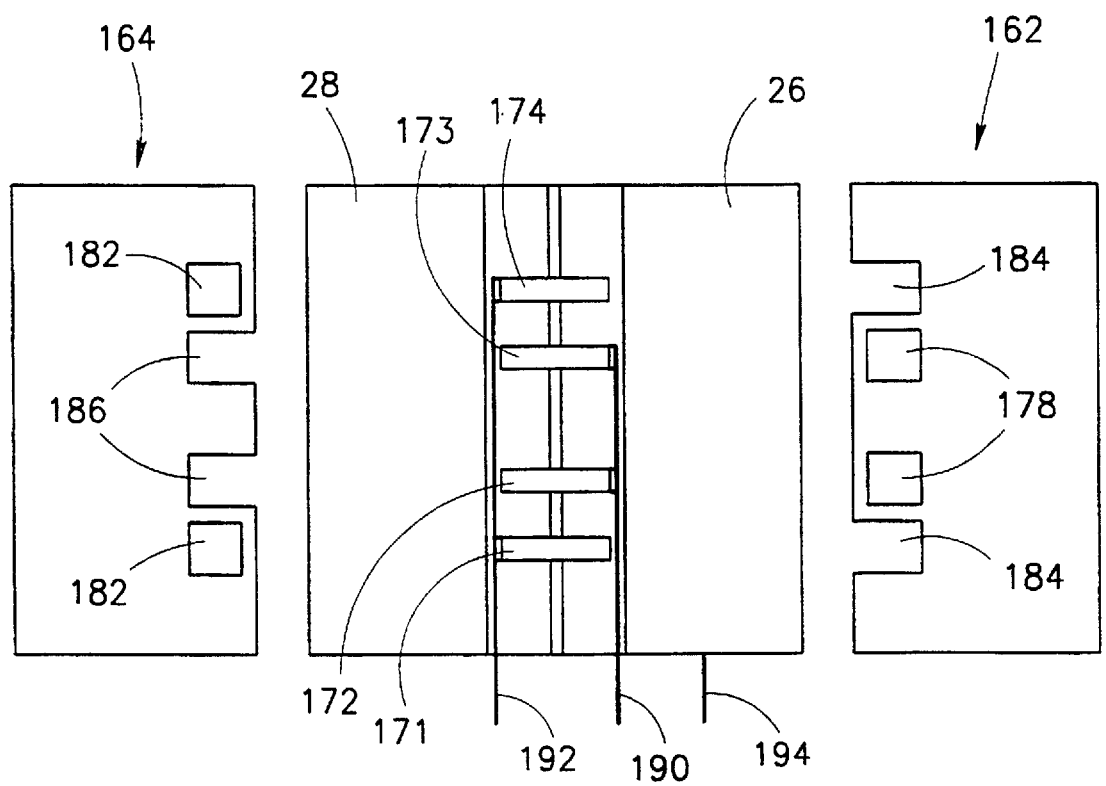

FIGS. 6A–6D show schematically a perspective view of a multi-flipper pixel 160, in accordance with a preferred embodiment of the present invention. Pixel 160 comprises two flippers, a first flipper 162 and a second flipper 164. Multi-flipper pixel 160 has three states, first, second and third states, that are shown in FIGS. 6A–6C respectively. FIG. 6D shows an exploded plan view of pixel 160 in the second state, which is shown in FIG. 6B.

Multi-flipper pixel 68 comprises a substrate 22 having an insulating layer 23. First and second lateral electrodes 26 and 28 and first, second, third and fourth central electrodes 171, 172, 173 and 174 are formed on insulating layer 23. First, second, third and fourth central electrodes 171, 172, 173 and 174 are most clearly shown in FIG. 6A and FIG. 6D.

First flipper 162 is coupled to pixel 160 by a pair of brackets 176, each of which loops through a different mounting hole 178 in first flipper 162. One of brackets 176 is anchored to second central electrode 172 and the other to third central electrode 173. Brackets 176 are preferably formed from a conducting material. First flipper 162 is in electrical contact with second and third central electrodes 172 and 173 and brackets 176. Preferably, electrical contact is achieved by physical contact of regions of first flipper 162 with regions of second and third central electrodes 172 and 173 and brackets 176.

Second flipper 164 is coupled to pixel 160 by a pair of brackets 180 that loop through mounting holes 182 in second flipper 164. One of brackets 180 is anchored to first electrode 171 and the other to fourth electrode 174. Brackets 180 are preferably formed from a conducting material. Second flipper 164 is in electrical contact with first and fourth central electrodes 171 and 174 and brackets 180. Preferably, electrical contact is achieved by physical contact of regions of second flipper 164 with regions of first and fourth central electrodes 171 and 174 and brackets 180.

The mounting of brackets 176 and 180 to their respective central electrodes are most clearly shown in FIG. 6A.

Mounting holes 178 and 182 and the manner in which brackets 176 and 180 loop through their respective mounting holes 178 and 182 respectively is most clearly shown in FIG. 6B.

Referring to FIG. 6B, first flipper 162 is preferably formed with clearance slots 184 that are large enough so that no part of flipper 162 makes electrical contact with first and fourth central electrodes 171 and 174 or any part of brackets 180. Similarly, second flipper 164 is preferably formed with clearance slots 186 that are large enough so that no part of second flipper 164 makes electrical contact with second and third central electrodes 172 and 173 or any part of brackets 176. External surfaces of brackets 176 and 180 are preferably covered with a layer of insulating material to assist in prevention of undesirable electrical contact with first and second flippers 162 and 164 respectively. First and second flippers 162 and 164 are preferably electrically isolated from each other and from first and second lateral electrodes 26 and 28 by appropriately placed non-conductive insulation nubs (not shown) or by layers of insulating material deposited on their surfaces. Mounting holes 178 and clearance slots 184 of flipper 162 and mounting holes 182 and clearance slots 186 of flipper 164 are most clearly shown in exploded plan view 6D.

A control line 190 is connected to second and third central electrodes 172 and 173 for applying voltage to second and third central electrodes 172 and 173 and thereby to first flipper 162. Connections between control line 190 and second and third central electrodes 172 and 173 are shown in FIG. 6A and FIG. 6D. A control line 192 is connected to first and fourth central electrodes 171 and 174 for applying voltage to first and fourth central electrodes 171 and 174 and thereby to second flipper 164. Connections between control line 192 and first and fourth electrodes 171 and 174 are shown in FIG. 6C and FIG. 6D. First lateral electrode 26 is connected to a control line 194 and second lateral electrode 28 is preferably permanently grounded.

First and second lateral electrodes 26 and 28 and each of the face surfaces of flippers 162 and 164 of pixel 160 are preferably treated to display one of the RGB colors. By appropriate choice of which electrodes 26 and 28 and face surfaces are treated to display which one of the RGB colors, pixel 160 displays a different one of the RGB colors in each one of its three different states. Exposed surfaces of first and second lateral electrodes 26 and 28 and face surfaces of first and second flippers 162 and 164 are labeled in each of FIGS. 6A–6C with the RGB color that they display. In FIG. 6A, which shows pixels 160 in a first state, pixel 160 displays a substantially saturated red color. In second and third states of pixel 160, which are shown respectively in FIGS. 6B and 6C, pixel 160 displays a substantially saturated blue and green color respectively. The choice of colors for face surfaces of flippers 162 and 164 and electrodes 26 and 28 are chosen by way of example and other color choices are possible and can be advantageous. For example the face surfaces of flippers 162 and 164 can be treated so that they display different levels of gray. Instead of displaying one of the RGB colors in each of its states, pixel 160 will then display a different gray level in each of its states.

Switching between first second and third states is accomplished in a manner similar to the way in which pixel 20 is switched between on and off states. For example, to switch pixel 160 from its first state shown in FIG. 6A to its second state shown in FIG. 6B flippers 162 and 164 are grounded and first lateral electrode 26 is raised to a flipping voltage. To switch pixel 160 from its second state to its third state shown in FIG. 6C, first lateral electrode 26, second flipper 164 and second lateral electrode 28 are grounded while first flipper 162 is raised to the flipping voltage. To switch pixel 160 back from its third state to its second state (FIG. 6B) first and second lateral electrodes 26 and 28 are grounded and first and second flippers 162 and 164 are raised to the flipping voltage. Pixel 160 is switched from second state to first state (FIG. 6B to FIG. 6A) by raising second flipper 164 to the flipping potential while grounding first lateral electrode 26 and first flipper 162.

To lock pixel 160 in any one of its states, first and second lateral electrodes 26 and 28 are grounded and voltages are applied to first and second flippers 162 and 164 so that appropriate small voltage differences are generated between adjacent lateral electrodes and flippers.

Figure 7:
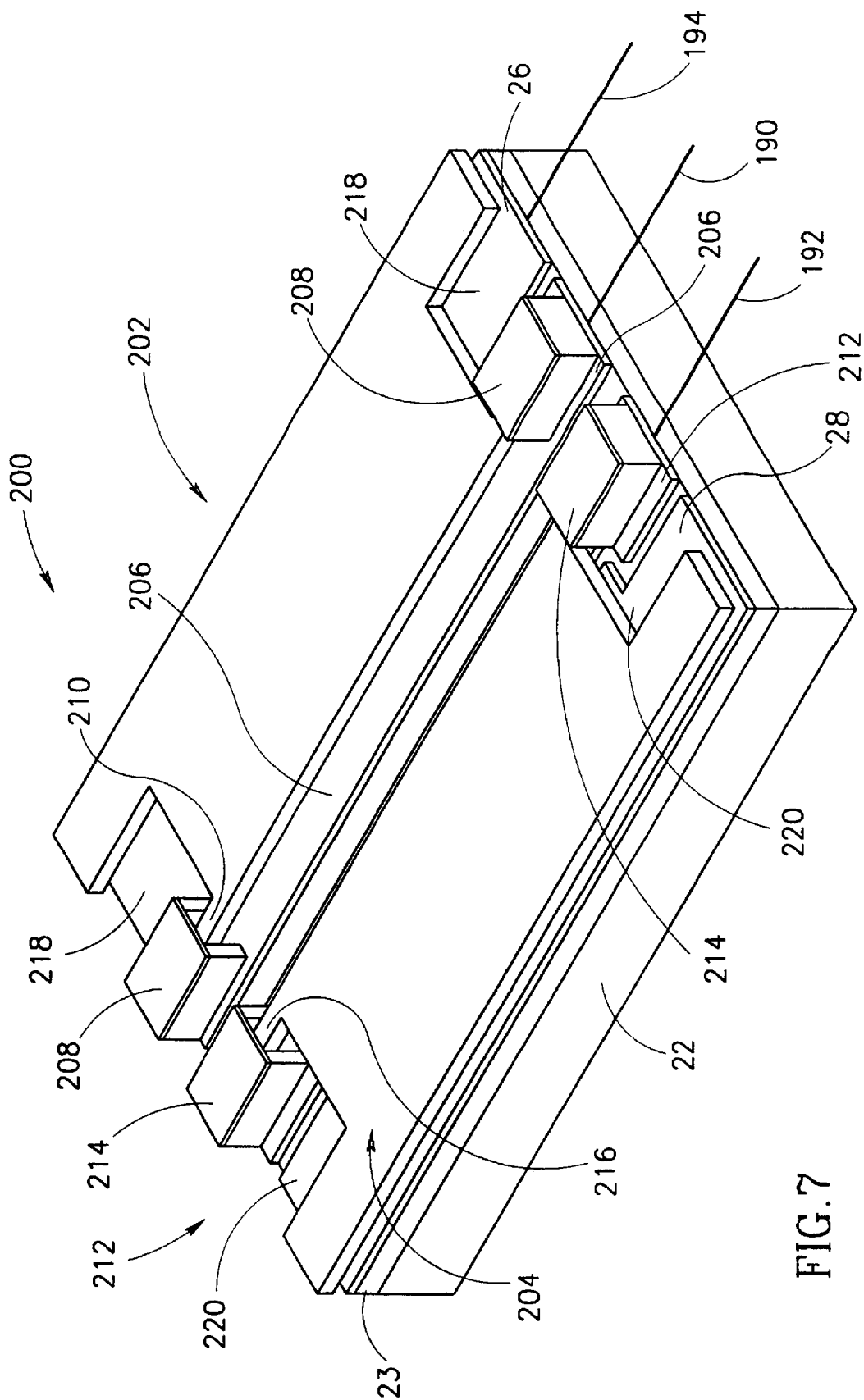
FIG. 7 shows another multi-flipper pixel, constructed in accordance with a preferred embodiment of the present invention.

FIG. 7 shows schematically a perspective view of another multi-flipper pixel 200, in accordance with a preferred embodiment of the present invention. Pixel 200 comprises two flippers 202 and 204. Multi-flipper pixel 200 is shown in a second state similar to the second state of multi-layer pixel 160 shown in FIG. 6B. Flipper 202 is coupled to a first central electrode 206 by two box hinges 208 that capture mounting extensions 210 (only one of which is shown) that protrude from flipper 202. Similarly, flipper 204 is coupled to a second central electrode 212 by two box hinges 214 that capture mounting extensions 216 (only one of which is shown). Flipper 202 is formed with clearance slots 218 that enable flipper 202 to clear both sets of box hinges 208 and 214 when flipper 202 is flipped from the position in which it is shown in FIG. 7 to a position in which it lies on top of flipper 204. Flipper 204 has similar clearance slots 220.

FIGS. 8A–8I illustrate schematically a fabrication procedure, in accordance with a preferred embodiment of the present invention, for forming pixel 20 shown in FIGS. 1A–1C.

Figure 8A:
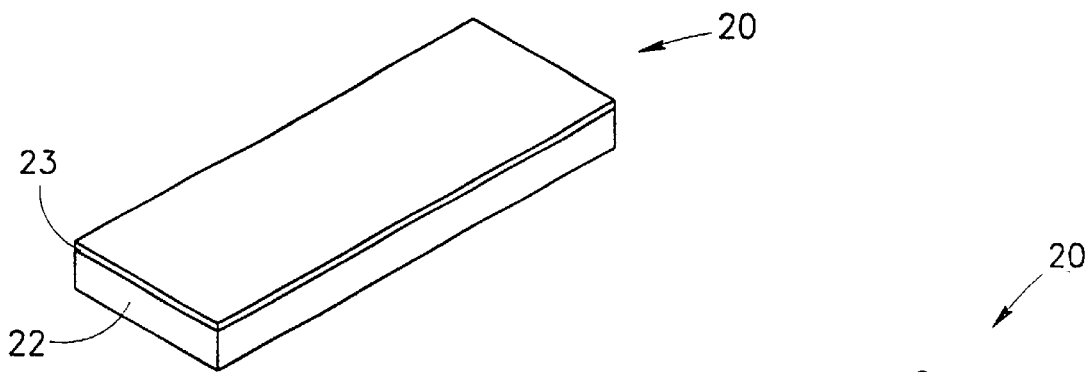
FIG. 8A–8N illustrate schematically a micro-machining fabrication process for producing the pixel shown in FIGS 1A–1C, in accordance with a preferred embodiment of the present invention.

FIG. 8A shows a first step in the fabrication process in which a substrate 22, preferably formed from a silicon wafer, is covered with a thin insulating layer 23, formed from a material such as silicon nitride.

Figure 8B:
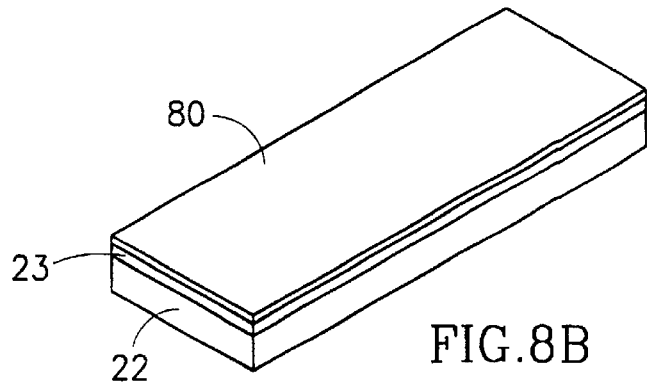
Figure 8C:
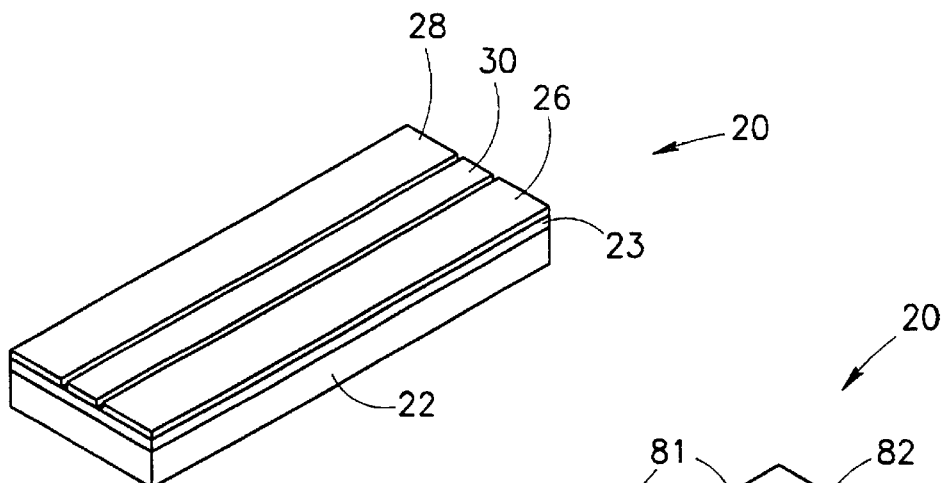

FIG. 8B shows a next step in the fabrication procedure in which insulating layer 23 is covered with a layer 80 of conducting material, such as polysilicon or a metal such as aluminum. Conducting layer 80 is then etched to form first and second electrodes 26 and 28 and central electrode 30, which electrodes 26, 28 and 30 are shown after they are formed in FIG. 8C.

Figure 8D:
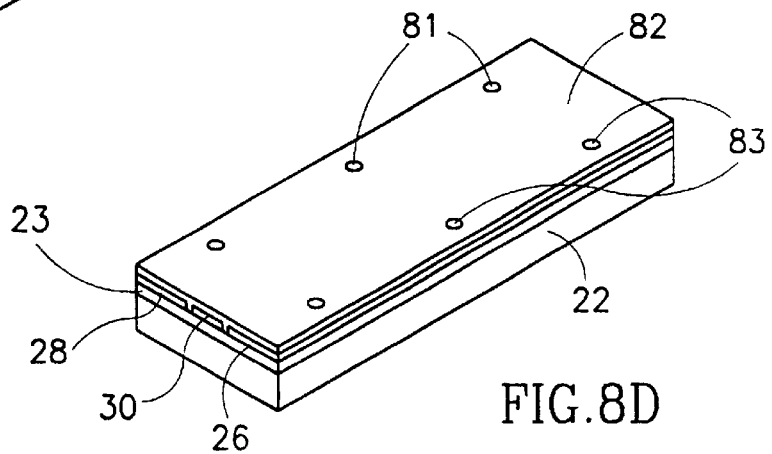
Figure 8E:
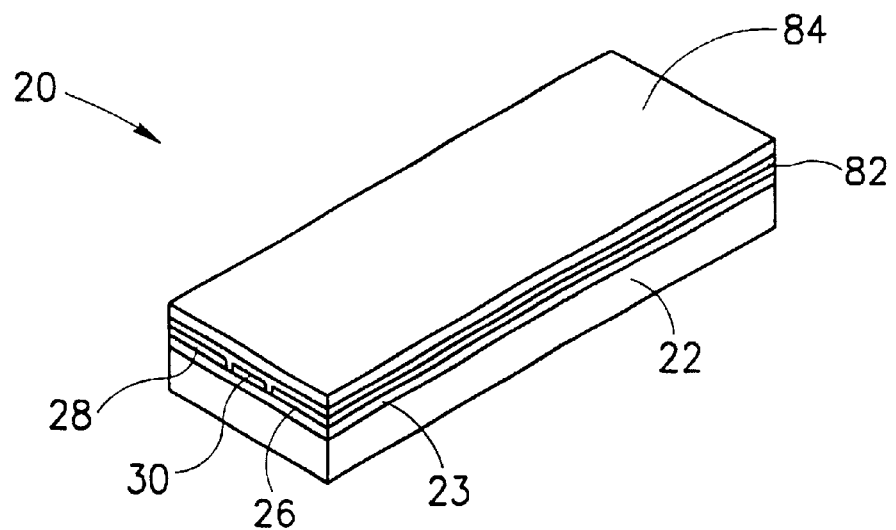
Figure 8F:
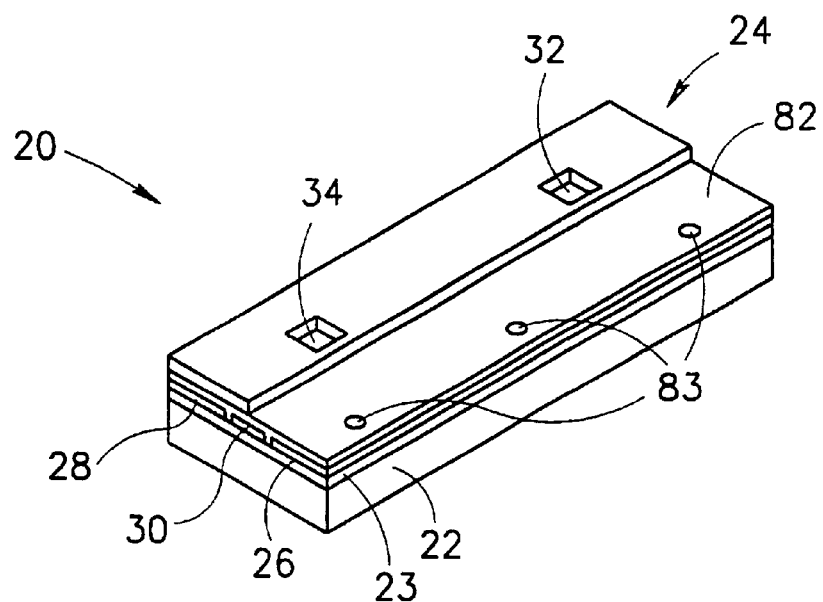

First, second and central electrodes 26, 28 and 30, and exposed surfaces of substrate 22 are then covered with a sacrificial layer 82 shown in FIG. 8D from an appropriate material such as silicon dioxide. Insulation nub wells 81 and insulation nub holes 83 are then etched into sacrificial layer 82. Insulation nub wells 81 are blind holes in sacrificial layer 82 that do not penetrate all the way to second electrode 28. Insulation nub holes 83 are through holes that penetrate all the way to first electrode 26. Insulation nub wells 81 are used to form insulation nubs 45 (FIG. 1A) on flipper 24 whereas insulation nub holes 83 are used to form insulation nubs 44 on first electrode 26. A layer 84, shown in FIG. 8E, of conducting material such as polysilicon or aluminum is then deposited on sacrificial layer 82. Conducting layer 84 is then etched, preferably to the depth of sacrificial layer 82 to form flipper 24 with mounting holes 32 and 34, as shown in FIG. 8F. In FIG. 8F insulation nub holes 83 are filled with the material of layer 84 that form insulation nubs 44 on first electrode 26.

Figure 8G:
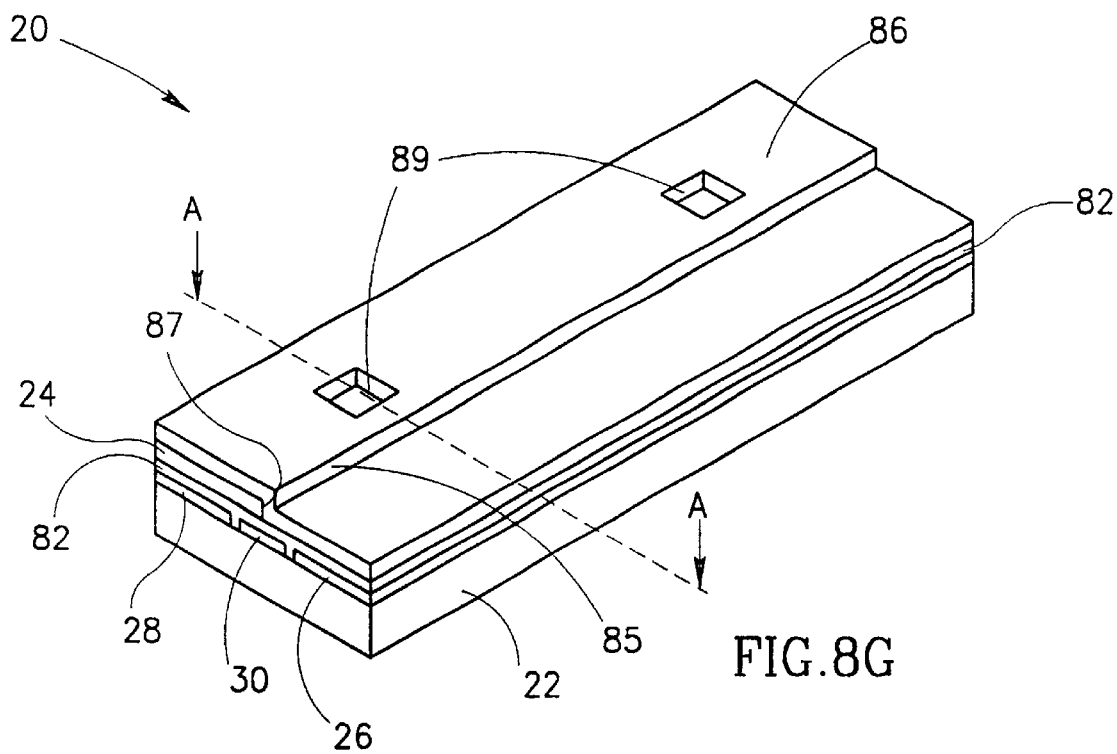

A second sacrificial layer 86, shown in FIG. 8G, is then deposited on the formed flipper 24 and exposed surface of sacrificial layer 82. Preferably, sacrificial layer 86 is formed from silicon dioxide if polysilicon is used as a material for flipper 24 and a polymer if aluminum is used as a material for flipper 24.

Figure 8H:
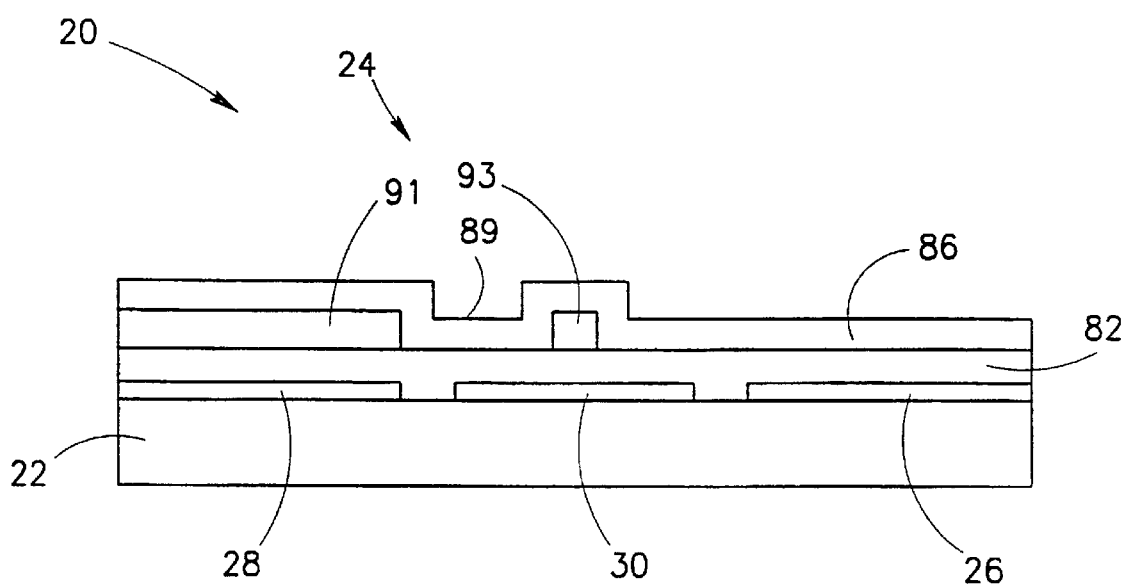

The shape of sacrificial layer 86 follows contours of surfaces on which it is deposited. As a result, sacrificial layer 86 has a step 85 in the vicinity of an edge 87 of flipper 24 and depressions 89 over mounting holes 32 and 34. FIG. 8H shows schematically a cross-section of the layers of pixel 20 that are shown in FIG. 8G, which cross-section is taken along a line A—A in FIG. 8G. The plane of the cross-section passes through the center of a depression 89. In the cross-section flipper 24 appears to have two disconnected parts, a large part 91 and a small part 93. Small part 93, hereinafter referred to as "axle part 93", is a part of flipper 24 that loops through U-bracket 38 of pixel 20 (FIGS. 1A–1C). Large part 91, hereinafter referred to as body part 91 is part of the body of flipper 24. Axle part 91 is not separate from body part 93 but appears so because the plane of the cross-section passes through mounting hole 34 (FIG. 8F) of flipper 20.

Figure 8I:
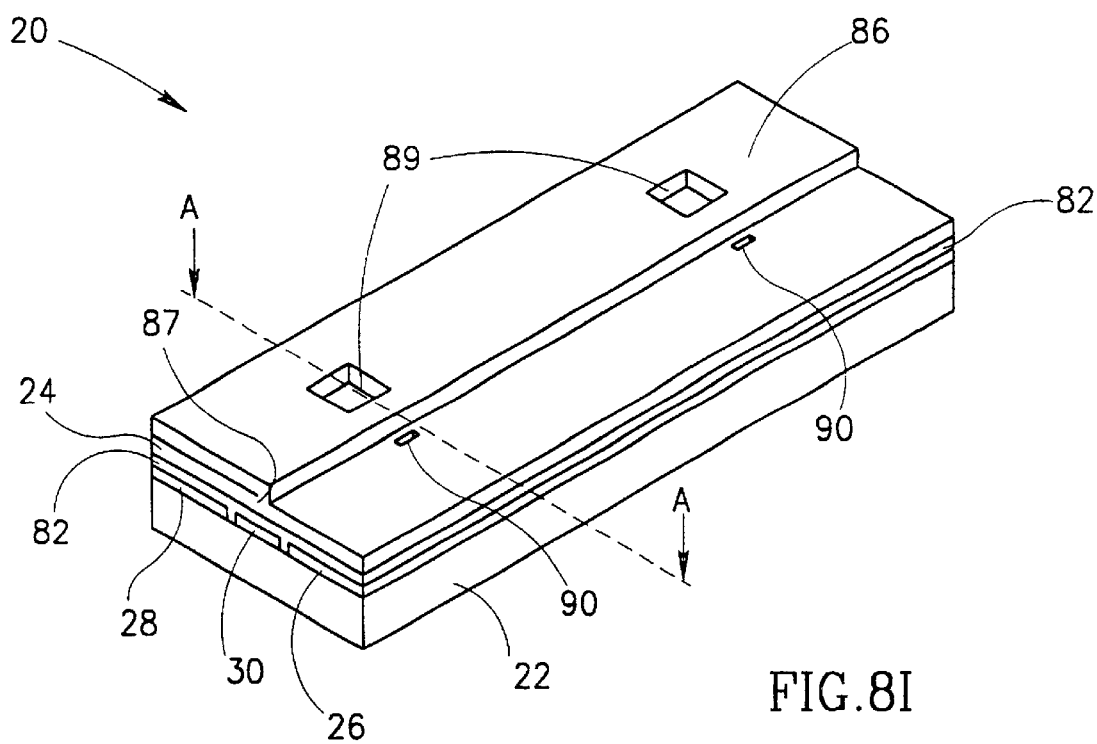
Figure 8J:
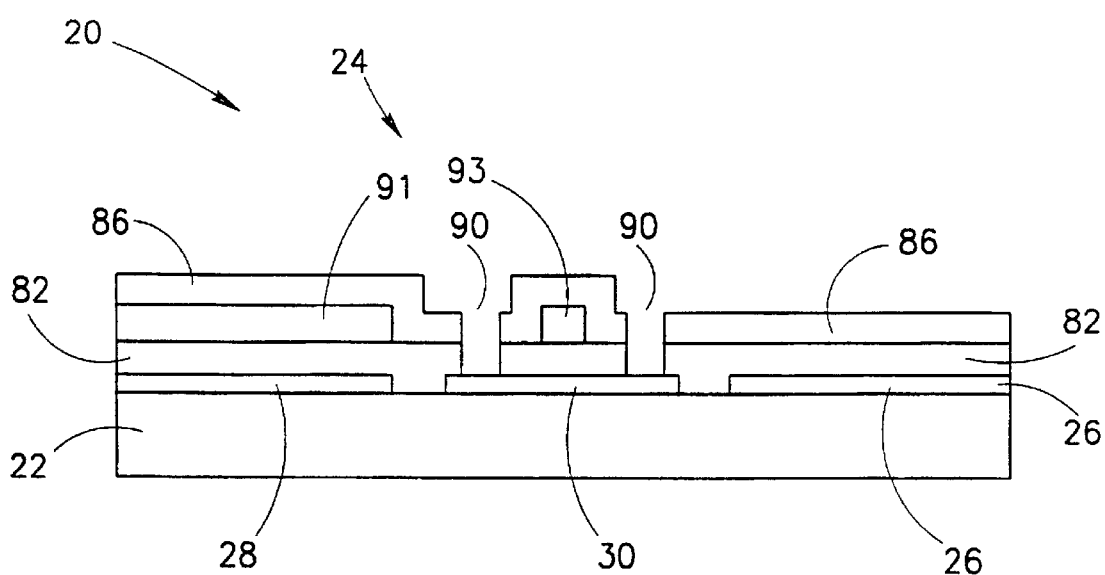

Following deposition of sacrificial layer 86, four holes 90 are "drilled" through sacrificial layers 86 and 82 all the way to the surface of central electrode 30 using methods known in the art, such as by plasma or other etching. The tops of two of holes 90 are shown in FIG. 8I. One other holes 90 is drilled through sacrificial layers 86 and 82 at the locations of each of depressions 89 and are not shown in the perspective of FIG. 8I. FIG. 8J shows schematically two holes 90 and layers of pixel 20 in a cross-section view along line A—A in FIG. 8I.

Figure 8K:
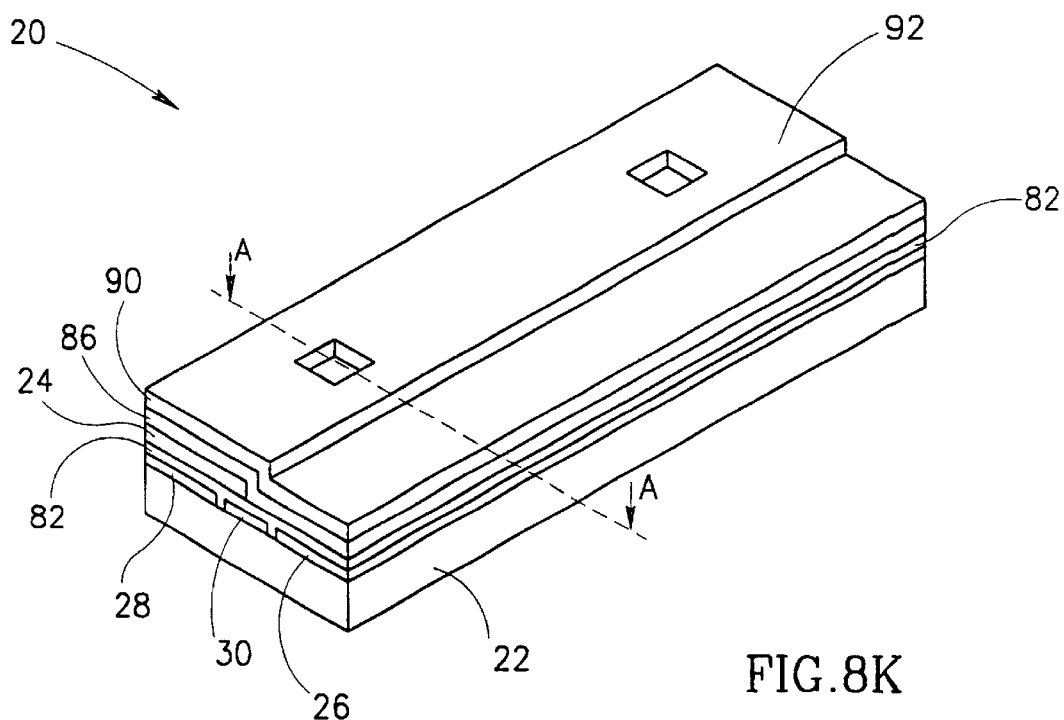

Holes 90 and depressions 89 are used as molds for forming parts of the "legs" of U brackets 36 and 38 (FIGS. 1A–1C) that loop through mounting holes 32 and 34 of flipper 24. The locations of holes 90 determine where on central electrode 30 the legs of U-brackets 36 and 38 are anchored. Holes 90 are not flush with regions of layer 86 that cover axle part 93 but are displaced from these regions. Technical limitations in the accuracy of placement of holes 90 require that holes 90 be distanced from regions of layer 86 that cover axle part 93 to prevent these regions being damaged in the process of forming holes 90. Sacrificial layer 86 serves to physically isolate axle part 93 (and body part 91) from a next conducting layer 92, shown in FIGS. 8K and 8L, that is deposited on layer 86 and other exposed areas of pixel 20. Layer 92 is used to form U-brackets 36 and 38. Damage to regions of layer 86 contiguous with axle portion 93 could result, for example, in axle part 93 being frozen to U-bracket 38, which would thereby render flipper 24 not rotatable.

Figure 8L:
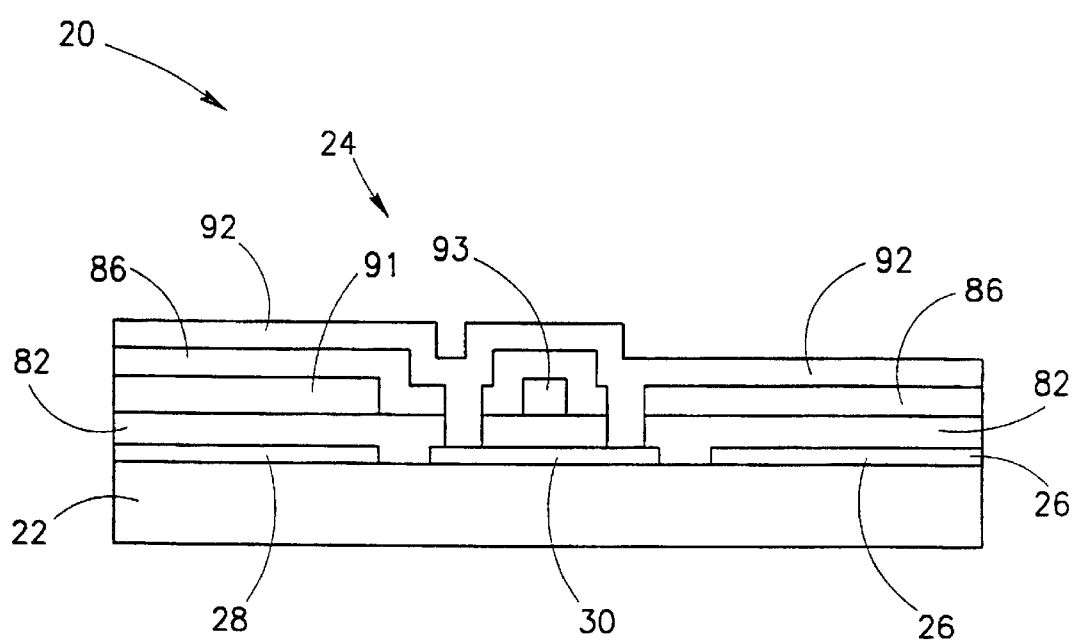

The conducting material of layer 92 that is deposited on pixel 20 following the deposition and drilling of layer 86 fills holes 90 and lines the walls of depressions 89. FIG. 8L shows layer 92 in a cross-section taken along line A—A of FIG. 8K. Preferably, layer 92 is formed from polysilicon. Layer 92 is etched away to form upper parts of brackets 36 and 38. (The lower parts of U-brackets 36 and 38 are formed by holes 90 and depressions 89 into which the material of layer 90 is deposited). Sacrificial layers 86 and 82 are then eroded away using methods known in the art to leave a fully formed pixel 20 shown in FIG. 8M. A cross-section of pixel 20 along line A—A in FIG. 8M is shown in FIG. 8N.

Figure 8M:
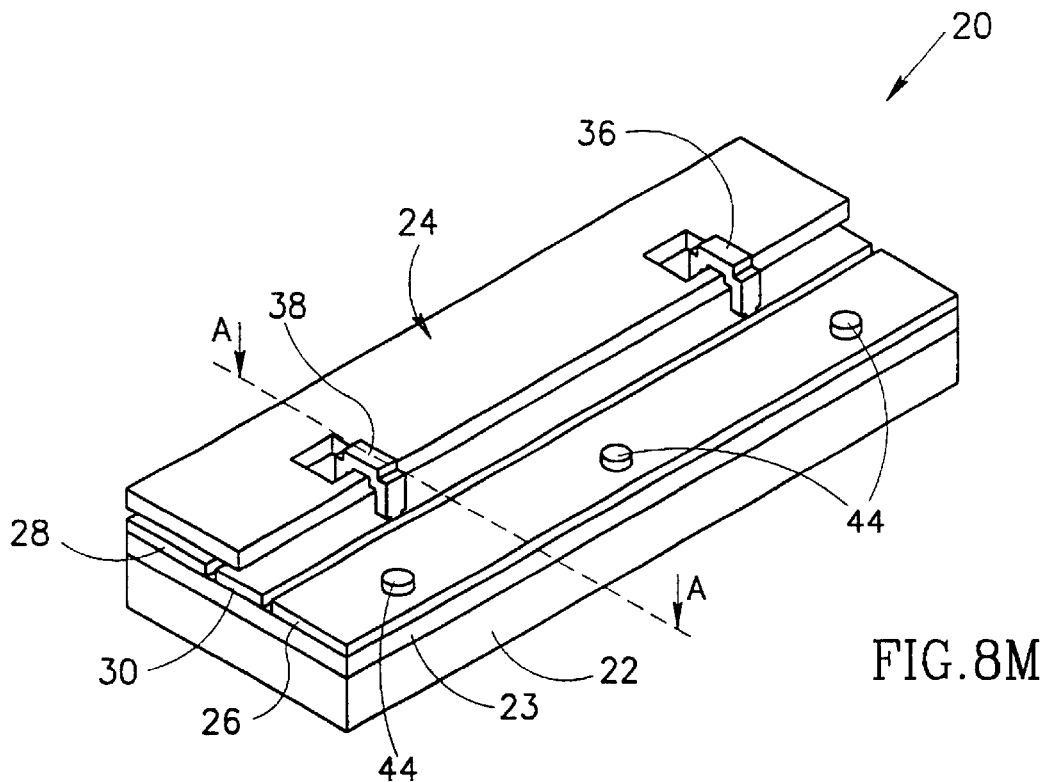
Figure 8N:
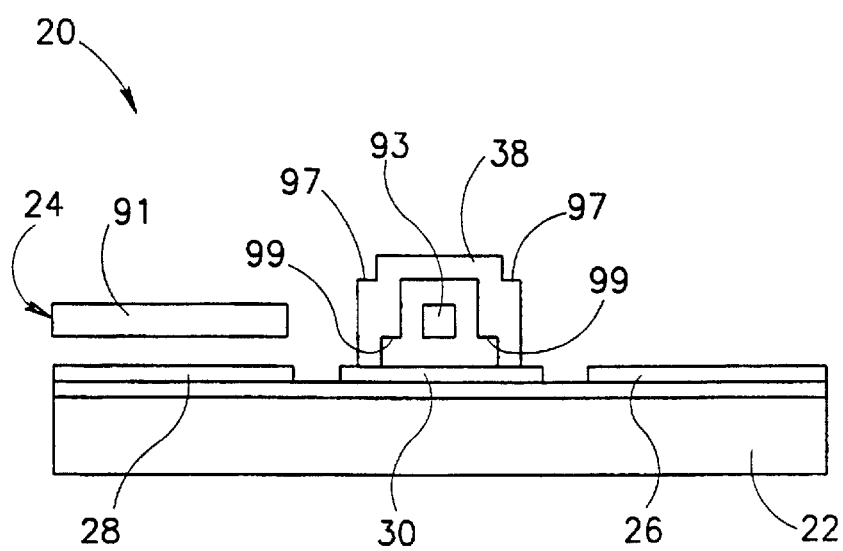

Brackets 36 and 38 in FIGS. 8M and 8N show some details resulting from the manufacturing process illustrated in FIGS. 8A–8L that were not shown in brackets 36 and 38 in previous figures. Among these details are external shoulders 97 shown in FIGS. 8M and 8N and internal shoulders 99 shown in FIG. 8N. Shoulders 97 and 99 result from the positioning of holes 90 which was discussed in the description of FIGS. 8I and 8J. The uneven widths of the legs of U-brackets 36 and 38, which are shown in FIG. 8M result from differences in the size of holes 90 and the parts of U-brackets 36 and 38 that are formed by etching away material of layer 92. In previous figures the shapes of U-brackets 36 and 38 were simplified and these details were not shown in the interests of clarity of presentation.

It should be noted that if axle part 93 falls below shoulders 99 shown in FIG. 8N undesirable "play" in the position of flipper 24 is increased. In addition, if axle part 99 falls below a shoulder 99 flipper 24 can get jammed under the shoulder and be prevented from rotating freely. The height of shoulders 99 is determined by the thickness of sacrificial layer 82. In order to prevent flipper 24 from falling below a shoulder 99 the thickness of sacrificial layer 82 in the production process shown in FIGS. 8A–8N must be less than the thickness of layer 91 from which flipper 24 is formed.

In pixels for which the thickness of layer 91 is thicker than the thickness of flipper 24, brackets 36 and 38 are produced using a method in which the height of shoulders 99 is not determined by the thickness of sacrificial layer 82 or brackets different from brackets 36 and 38 are used to couple flipper 24 to central electrode 30. It can be advantageous to use a relatively thick sacrificial layer 82 in order to increase the space between flipper 24 and first electrode 26 and second electrode 28 when flipper 24 is in the on and off position respectively in order to decrease stiction. A possible manufacturing procedure for producing brackets 36 and 38 with "low" shoulders is discussed at the end of the discussion of FIG. 12L.

Other pixels and brackets for mounting flippers to pixels, in accordance with preferred embodiments of the present invention are shown in FIGS. 9A–11. Pixels and brackets shown in FIGS. 9A–11 are produced using fabrication procedures that are variations of the procedure illustrated in FIGS. 8A–8I.

Figure 9A:
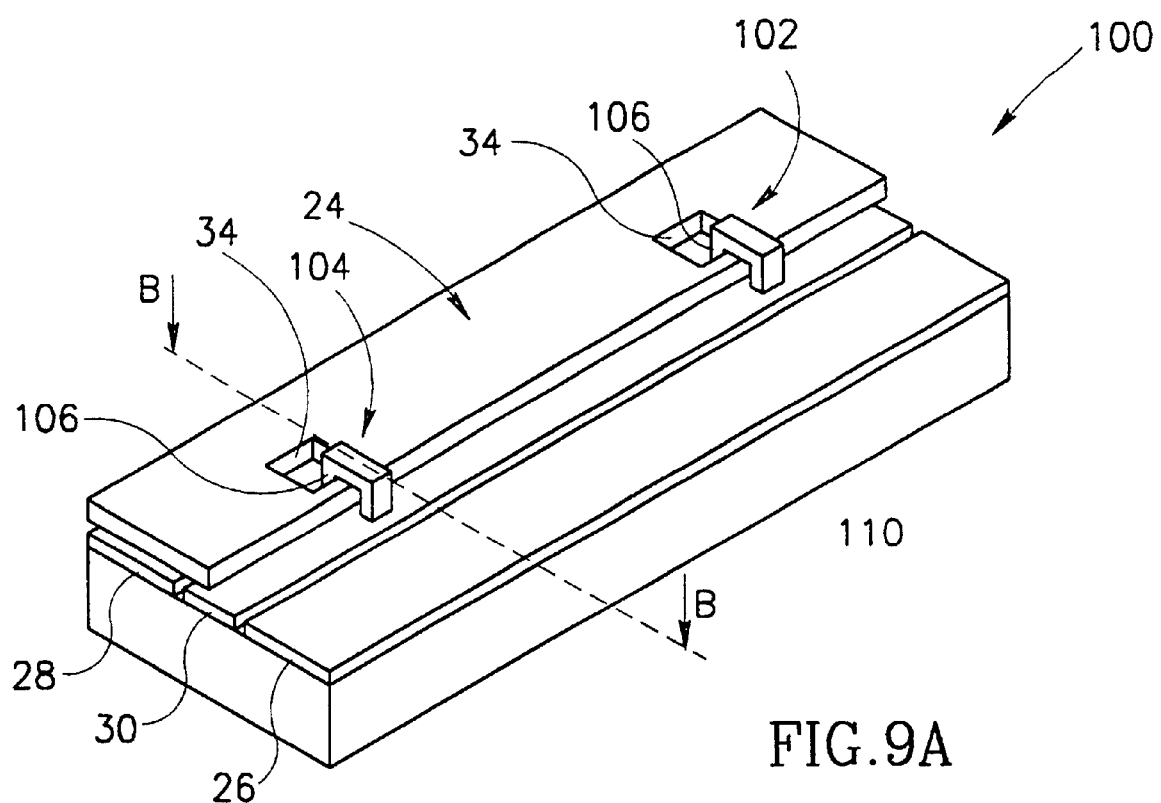
FIGS. 9A and 9B show schematically a perspective view and a cross-section view respectively of another pixel, constructed in accordance with a preferred embodiment of the present invention.
Figure 9B:
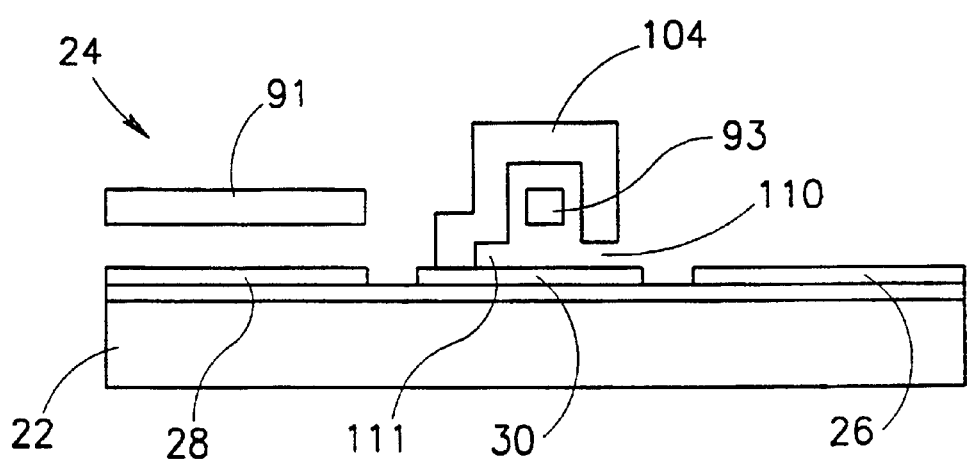

FIGS. 9A–9B schematically show a pixel 100 comprising a flipper 24, in accordance with a preferred embodiment of the present invention. Referring to FIG. 9A, pixel 100, which is shown in a perspective view, is very similar to pixel 20. The only difference is in the construction of the brackets that couple flipper 24 to electrode 30. In pixel 20 flipper 24 is coupled to electrode 30 by U brackets 36 and 38 each of which has two legs that attach the U bracket to electrode 30. In pixel 100 flipper 24 is coupled to electrode 30 with brackets 102 and 104 each of which has a single leg 106 that attaches the bracket to electrode 30. Each of brackets 102 and 104 has a second leg 108 that does not extend all the way to electrode 30. There is a gap 110 between the end of leg 106 of each of brackets 102 and 104 and electrode 30. Gap 110 is best seen in a profile view of pixel 100 taken along a line B—B shown in FIG. 9A. Gap 110 is made small enough so that flipper 24 does not slip out or shake loose from brackets 102 and 104. Brackets 102 and 104 are smaller than brackets 36 and 38 because brackets 102 and 104 are anchored to central pixel 30 at one location whereas brackets 36 and 38 are anchored to central pixel 30 at two locations.

The decreased size of brackets 102 and 104 with respect to brackets 36 and 38 is advantageous. When surfaces of a pixel, in accordance with a preferred embodiment of the present invention, are treated to give the pixel a first and second color, e.g. black and white, the flipper of the pixel is turned to an on position, for example, and all exposed surfaces of the pixel are treated to give them the first color. The pixel flipper is then turned to the off position and all exposed surfaces of the pixel in the off position are treated so that they have the second color. Surfaces that are exposed in both the on and the off position of the flipper therefore have the second color. As a result, with the flipper is in the off position the pixel displays more of the second color than the pixel displays of the first color when the flipper is in the on position. This asymmetry is undesirable and surfaces of the pixel that are always exposed should be reduced to a minimum. Substantially all surfaces of brackets used to couple a flipper to a pixel are exposed in both the on and off positions of the flipper and it is therefore advantageous to reduce the size of brackets that are used to couple a flipper to a pixel.

Figure 10A:
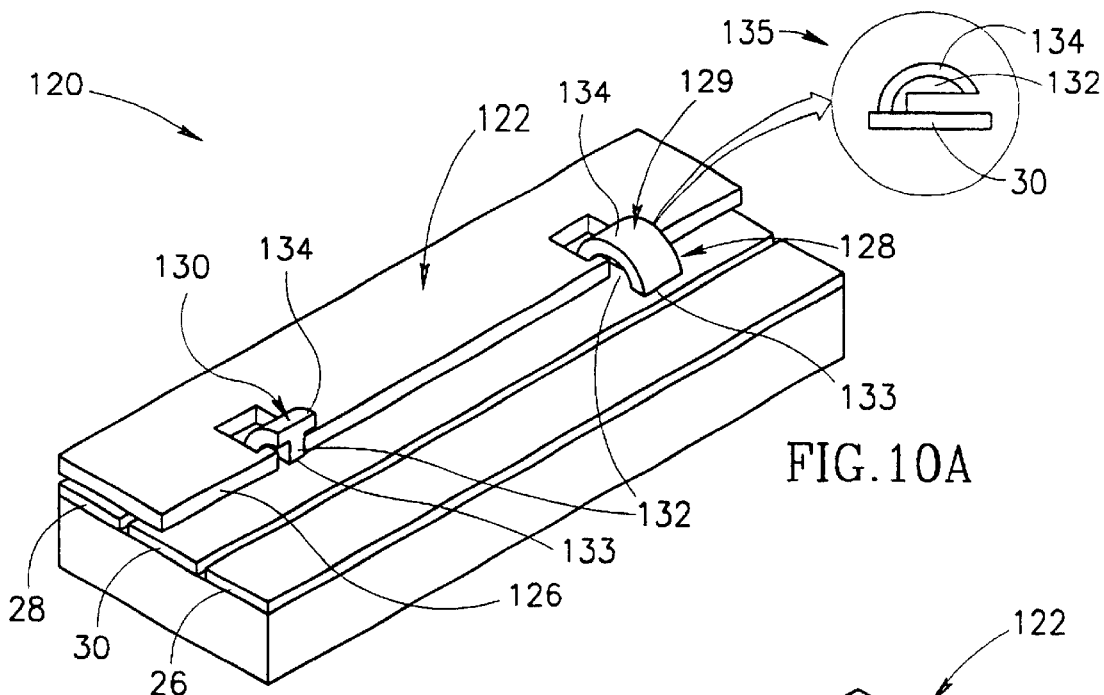
FIGS. 10A and 10B show schematically perspective views of another pixel and a flipper respectively, constructed in accordance with a preferred embodiment of the present invention.
Figure 10B:
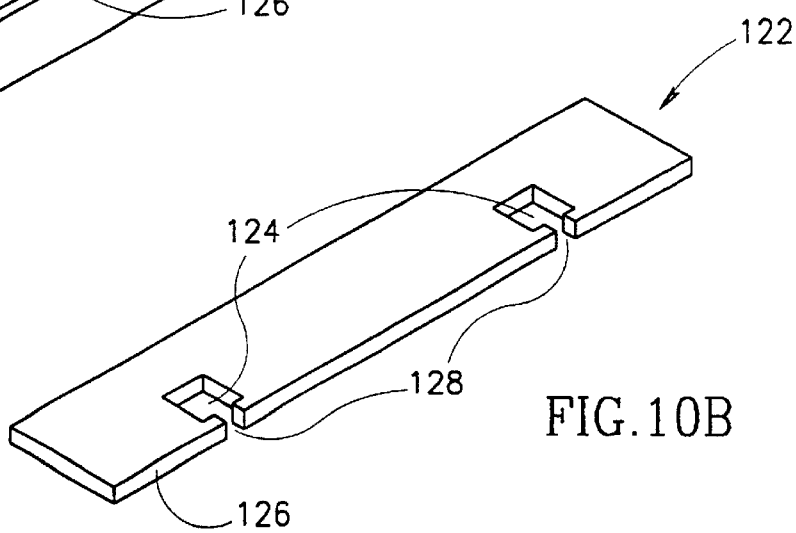

FIGS. 10A–10B schematically show perspective views of another pixel 120 comprising a flipper 122, in accordance with a preferred embodiment of the present invention. Referring to FIG. 10B, flipper 122 has mounting holes 124 and an edge 126 having slots 128 that merge with mounting holes 124. Referring to FIG. 10A flipper 122 is coupled to central electrode 30 by preferably identical brackets 129 and 130. Bracket 130 is cut away in FIG 10A to show its construction. Each of brackets 129 and 130 comprises a septum 132 and a rim 134. Septa 132 of brackets 129 and 130 fit in slots 128 of flipper 122 and prevent movement of flipper 122 in a direction parallel to edge 126. Rims 134 of brackets 129 and 130 prevent flipper 122 from detaching from brackets 129 and 130.

As in the case of brackets 102 and 104 shown in FIG. 9A, preferably, each of brackets 129 and 130 is anchored to central electrode 30 at only one location. Preferably, one end of each of rims 134 is anchored to central electrode 30 and a small space 133 separates most of each septum 132 and each of the other end of a rim 134 from central electrode 30. Insert 135 in FIG 10A shows a schematic profile view of bracket 134 and central electrode 30 that illustrates the manner in which bracket 129 is attached to central electrode 30.

Figure 11:
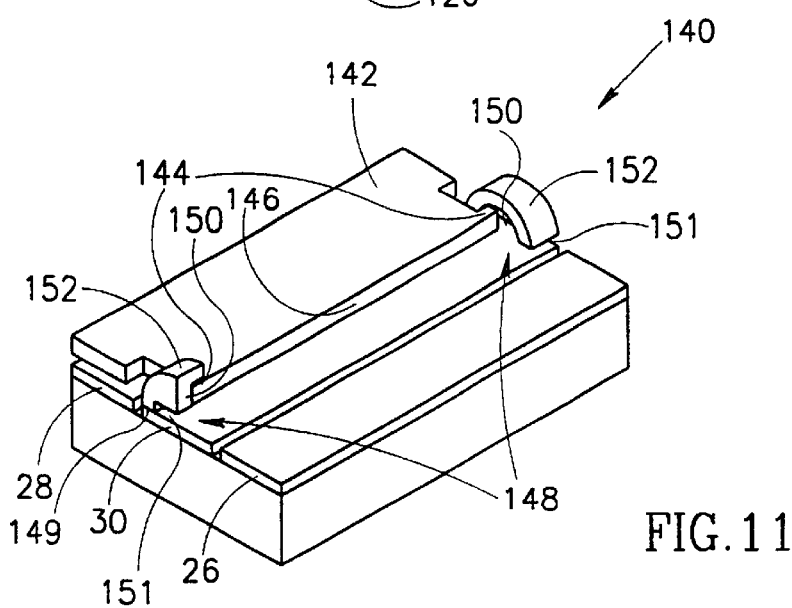
FIG. 11 shows schematically another pixel, in accordance with a preferred embodiment of the present invention.

FIG. 11 schematically shows a perspective view of another pixel 140 comprising flipper 142, in accordance with a preferred embodiment of the present invention. Flipper 142 has protuberances 144 at opposite ends of edge 146 of the flipper. Protuberances 144 are held in socket brackets 148. Socket brackets 148 comprise a back panel 150 and a rim 152. Back panel 150 prevents flipper 142 from shifting laterally in a direction parallel to edge 146. Rims 152 prevent flipper 142 from separating from socket brackets 146. Each of brackets 148 is preferably anchored to central electrode 30 at one location by a "foot" 149, only one of which is shown in FIG. 11. A small space 151 separates most of the body of a bracket 148 from central electrode 30.

In an alternative design of socket brackets 146 socket brackets 148 comprise only rims 152. Rims 152 prevent flipper 142 from shifting laterally in a direction parallel to edge 146 as a result of contact of rims 150 with the short edges of flipper 142.

It should be noted that whereas pixels and flippers shown in FIGS. 1A–11 are rectangular, pixels having shapes other than rectangular, in accordance with preferred embodiments of the present invention, are possible and can be advantageous. For example, pixels can be formed in accordance with preferred embodiments of the present invention in which the pixels are diamond shaped or hexagonal. A flipper for a diamond shaped pixel would be triangular and cover half the area of the pixel. A flipper for an hexagonal shaped pixel would cover half the hexagonal area of the pixel.

FIGS. 12A–12K illustrate schematically a process for forming pixel 100 shown in FIGS. 9A and 9B. FIGS. 12A–12K show cross-sectional views taken along a line A—A shown in FIG. 9A of a process for forming and etching layers required to produce pixel 100.

Figure 12A:
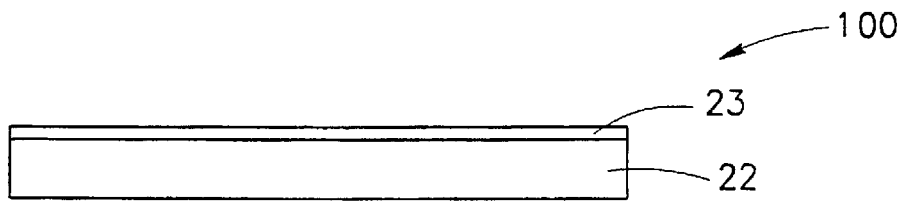
FIGS. 12A–12L illustrate schematically a micro-machining fabrication process for producing the pixel shown in FIGS. 9A–9B.
Figure 12B:
Figure 12C:
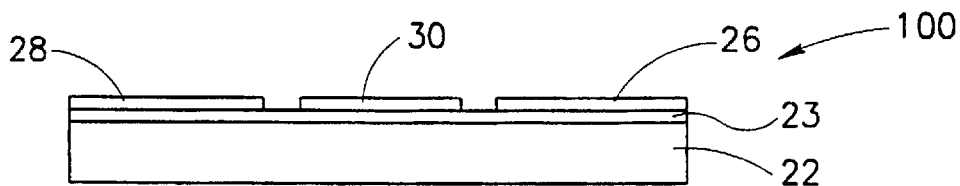
Figure 12D:
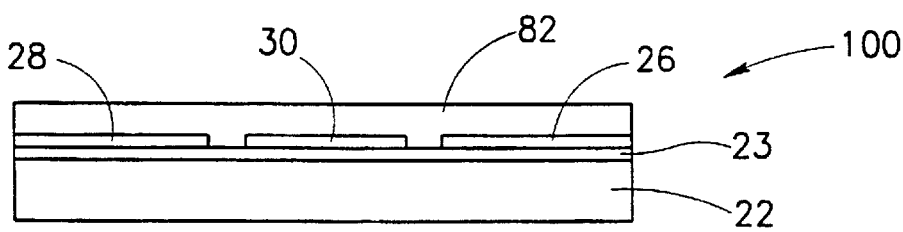
Figure 12E:
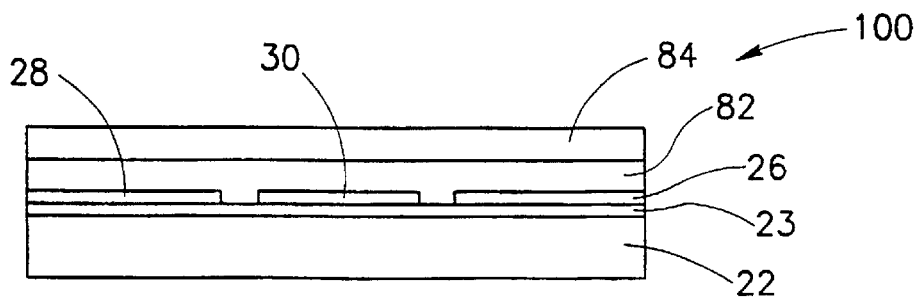
Figure 12F:
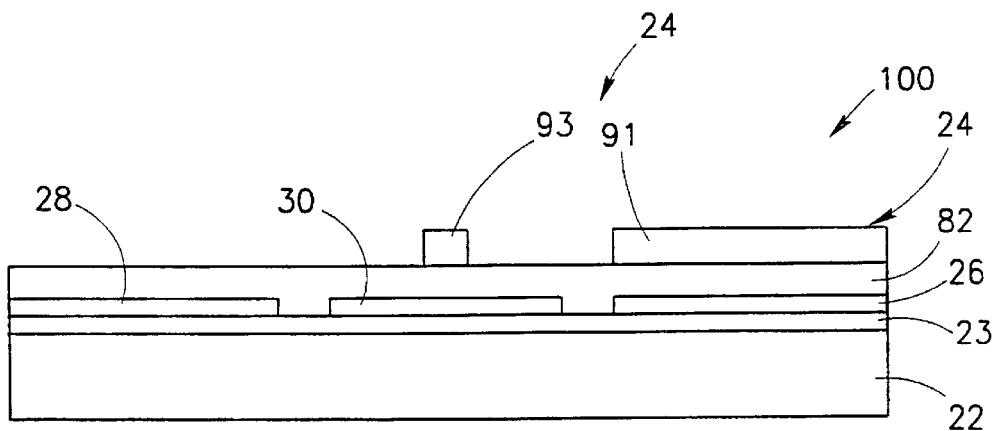

Production steps illustrated in profile in FIGS. 12A–12F are identical to steps in the production of pixel 20 shown in perspective views in FIGS. 8A–8F respectively. In FIG. 12A insulating layer 23 is deposited on substrate 22. A layer 80, shown in FIG. 12B, of conducting material is then deposited on insulating layer 23. Layer 80 is etched to form first, second and central electrodes 26, 28 and 30 respectively which are shown in FIG. 12C. In FIG. 12D electrodes 26, 28 and 30 and exposed surfaces of insulating layer 23 are covered with sacrificial layer 82. Sacrificial layer 82 is covered with a layer 84 of conducting material, which is shown in FIG. 12E. Layer 84 is etched to produce flipper 24 shown in FIG. 12F. In the cross-section view shown in FIG. 12F and in FIGS. 12G–12K that follow, flipper 24 appears to have two disconnected parts, an axle part 93 and a body part 91, however this is only an artifact of the choice of cross-sectional cut.

Figure 12G:
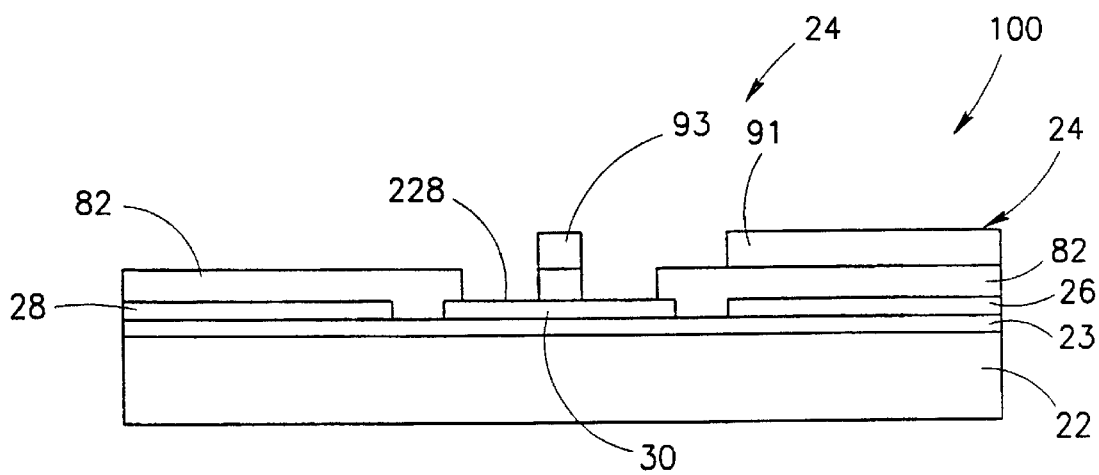
Figure 12H:
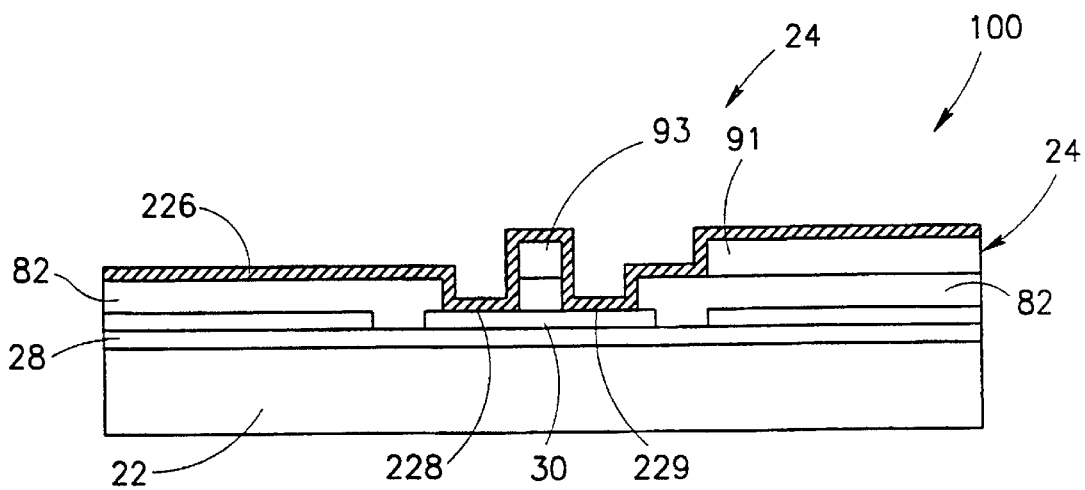
Figure 12I:
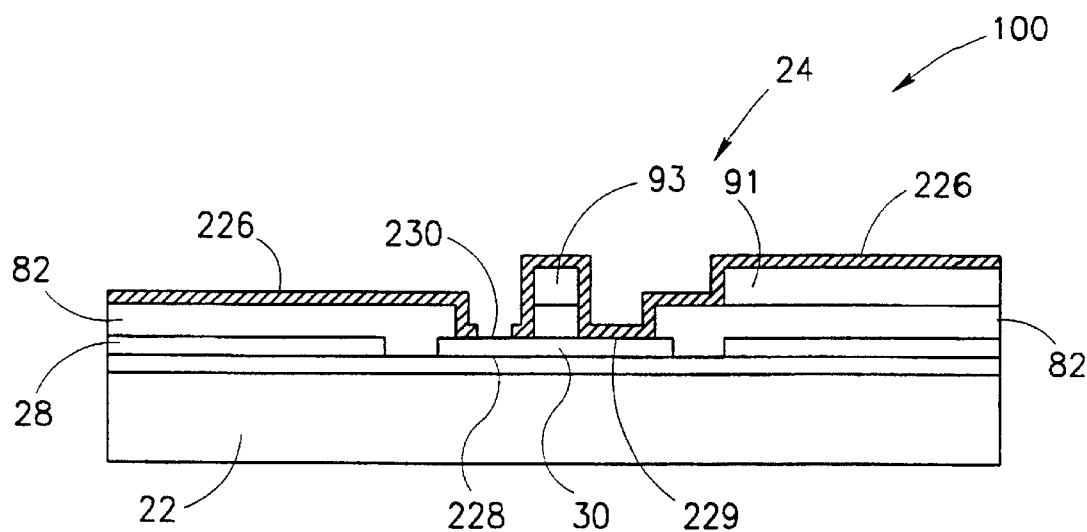
Figure 12J:
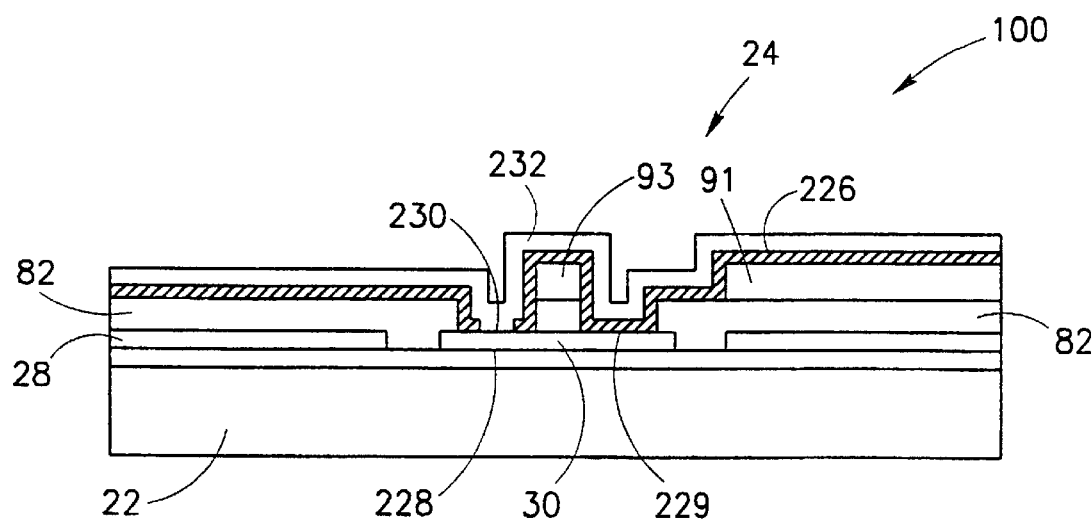
Figure 12K:
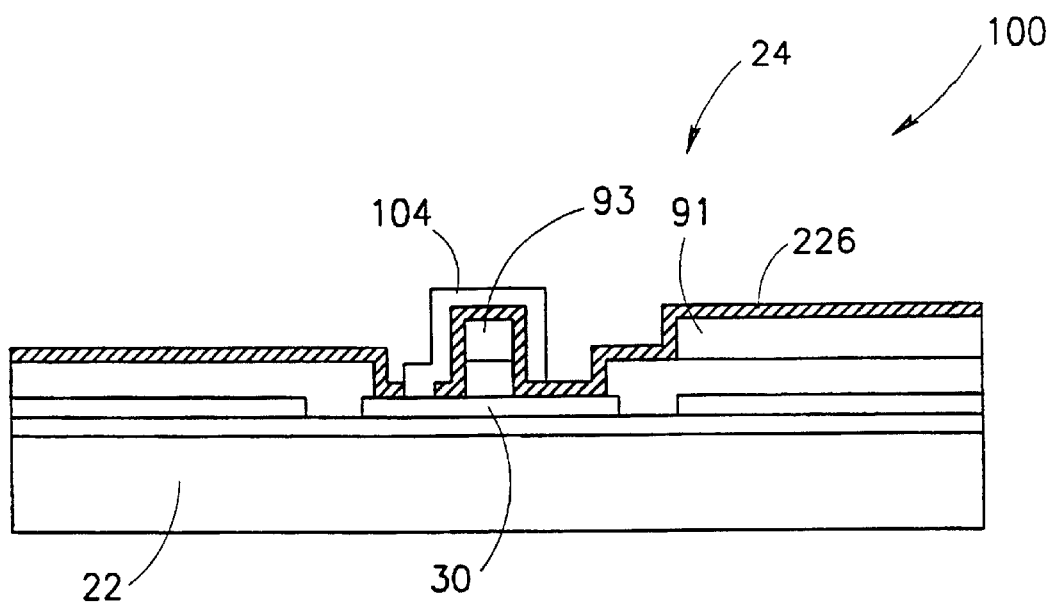
Figure 12L:
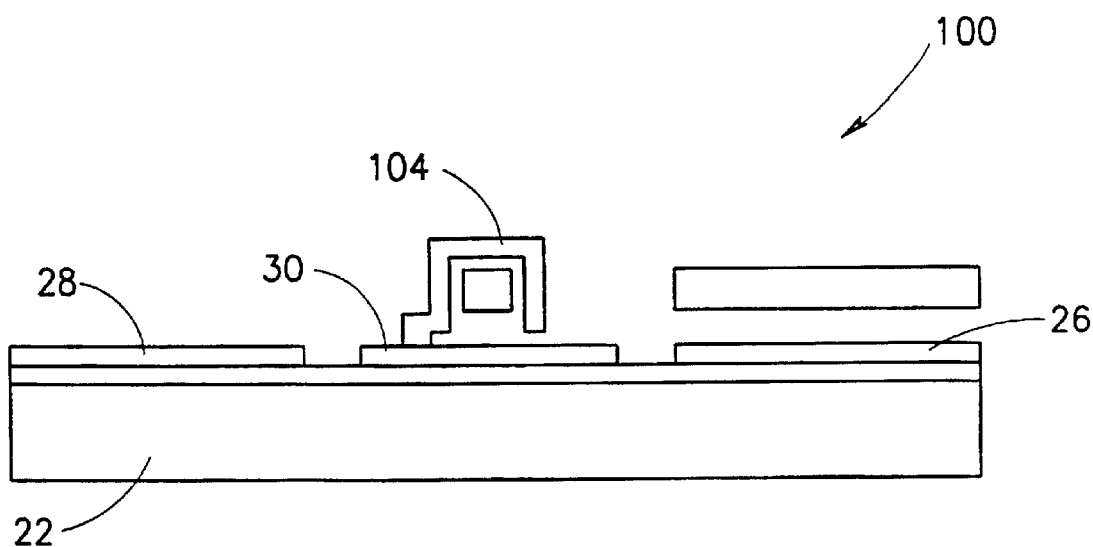

Following the etching of flipper 24, portions of sacrificial layer 82 are etched away as shown in FIG. 12G to lay bare regions 228 and 229 of central electrode 30. A relatively thin sacrificial layer 226 is then deposited on all exposed surfaces of pixel 100. Sacrificial layer 226 is then etched to uncover a small region 230, shown in FIG. 12I, of central electrode 30. Sacrificial layer 226 serves to physically isolate axle part 93 (and body part 91) from a next conducting layer 232, shown in FIG. 12J, that is deposited on pixel 100. Region 230 that is uncovered when sacrificial layer 226 is etched, serves as an area of central electrode 30 to which conducting layer 232 bonds strongly.

Conducting layer 232 is etched to form bracket 104 and all sacrificial layers are eroded way to form pixel 100 shown in FIG. 9K and also in FIGS. 9A and 9B.

It should be noted that if sacrificial layer 226 is etched in region 229 in the same way that sacrificial layer 226 is etched in region 228 to expose region 230, conducting layer 232 would bond strongly to central electrode 30 in two places, one place on either side of axle part 93. A symmetric bracket anchored to central electrode 30 in two places similar in shape to bracket 38 shown in FIG. 8N could then be formed. A bracket formed in this way would however have shoulders similar to shoulders 99 of bracket 38 but with a height determined not by the thickness of sacrificial layer 82 but by the thickness of sacrificial layer 226.

In the description and claims of the present application, each of the verbs, "comprise" "include" and "has", and conjugates thereof, are used to indicate that the object or objects of the verb are not necessarily a complete listing of components, elements or parts of the subject or subjects of the verb.

The present invention has been described using non-limiting detailed descriptions of preferred embodiments thereof that are provided by way of example and are not intended to limit the scope of the invention. Variations of embodiments described will occur to persons of the art. For example, a pixel in accordance with a preferred embodiment of the present invention may comprise different combinations of features and elements of the preferred embodiments of the present invention described above. In some preferred embodiments of the present invention, a pixel might omit features and/or elements comprised in the described preferred embodiments. In other pixels in accordance with a preferred embodiment of the present invention, features and/or elements shown only in different ones of the described preferred embodiments may be combined. The scope of the invention is limited only by the following claims.

What is claimed is:

1. A plurality of pixel structures for use in a visual display, each said pixel comprising:
   a surface having an area less than 1 square millimeter comprising first and second regions having surface finishes; and
   a thin planar panel having first and second sides having surface finishes, wherein said panel is rotatably coupled to said surface so as to rotate between a first and a second position about an axis parallel to said surface;
   wherein said panel in said first position is positioned over said first region with its second side facing said first region and wherein in said second position said panel is positioned over said second region with its first side facing said second region.

2. A plurality of pixel structures according to claim 1 wherein when said panel is in said first position it obscures substantially all of said first region.

3. A plurality of pixel structures according to claim 1 wherein when said panel is in said second position it obscures substantially all of said second region.

4. A plurality of pixel structures according to claim 1 wherein said plurality of pixels is produced using micro-machining technology.

5. A plurality of pixel structures according to claim 1 wherein said surface has an area less than 0.25 square millimeters.

6. A plurality of pixel structures according to claim 1 wherein said surface has an area less than 5000 square microns.

7. A plurality of pixel structures according to claim 1 wherein said surface has an area less than 2000 square microns.

8. A plurality of pixel structures according to claim 1 wherein said first and second regions of said surface have first and second planar electrodes respectively.

9. A plurality of pixel structures according to claim 8 wherein at least one of said first and second electrodes has at least one non-conducting protuberance on its surface.

10. A plurality of pixel structures according to claim 9 wherein said panel is formed from a conducting material.

11. A plurality of pixel structures according to claim 10 wherein at least one side of said panel has at least one non-conducting protuberance thereon.

12. A plurality of pixel structures according to claim 10 wherein said first and second sides have a non-conductive coating.

13. A plurality of pixel structures according to claim 10 wherein said panel is rotated between first and second positions by electrostatic forces acting on said panel that are generated by applying voltages to said first and second electrodes and to said panel.

14. A plurality of pixel structures according to claim 13 wherein said panel is rotated from said first position to said second position by grounding said second electrode and applying a same voltage to said first electrode and said panel.

15. A plurality of pixel structures according to claim 14 wherein said panel is rotated from said second position to said first position by grounding said panel and said second electrode and applying a voltage to said first electrode.

16. A plurality of pixel structures according to claim 14 wherein said panel is rotated from said second position to said first position by applying a same voltage to said second electrode and said panel and grounding said first electrode.

17. A plurality of pixel structures according to claim 1 wherein said panel is rapidly rotated between first and second positions in a time shorter than the response time of the eye so that said pixel appears to have a finish that is a mix between said finishes of said first side and said second region and said finishes of said second side and said first region.

18. A plurality of pixel structures according to claim 1 wherein said finish of said first region and said finish of said second side of said panel are the same.

19. A plurality of pixel structures according to claim 1 wherein said finish of said second region and said finish of said first side of said panel are the same.

20. A plurality of pixel structures according to claim 1 wherein said finish of said first region appears white.

21. A plurality of pixel structures according to claim 1 wherein said finish of said first region displays a color that is a color of a tristimulus set of colors.

22. A plurality of pixel structures according to claim 21 wherein said tistimulus set of colors is RGB.

23. A plurality of pixel structures according to claim 1 wherein said finish of said first region is luminescent.

24. A plurality of pixel structures according to claim 1 wherein said finish of said second region displays a color of a tristimulus set of colors.

25. A plurality of pixel structures according to claim 1 wherein said finish of said second region is luminescent.

26. A plurality of pixel structures according to claim 1 wherein said finish of said second region appears black.

27. A plurality of pixel structures according to claim 1 wherein at least one pixel of said plurality of pixels comprises at least one additional thin panel that has first and second sides having surface finishes and wherein said at least one additional panel is rotatably coupled to said surface of said at least one pixel so as to rotate between first and second positions about an axis that is parallel to said surface.

28. A plurality of pixel structures according to claim 27 wherein all said axes about which panels of said at least one pixel rotate are substantially coincident.

29. A plurality of pixel structures according to claim 27 wherein panels of said at least one pixel that are in said first position are positioned one over the other in a stack over said first region with their second sides facing said first region and panels in said second position are positioned one over the other in a stack over said second region with their first sides facing said second region.

30. A plurality of pixel structures according to claim 29 wherein a top-most panel in a stack of panels substantially obscures all panels below said top-most panel and said first region or said second region so that at any one time said at least one pixel displays only two of said surface finishes.

31. A plurality of pixel structures according to claim 30 wherein all panels of said at least one pixel are formed from conducting material.

32. A plurality of pixel structures according to claim 31 wherein at least one side of at least one panel of said at least one pixel has at least one non-conducting protuberance thereon.

33. A plurality of pixel structures according to claim 31 wherein at least one side of at least one panel of said at least one pixel has a nonconducting coating.

34. A plurality of pixel structures according to claim 31 wherein panels of said at least one pixel are rotated between said first and second positions by electrostatic forces acting on said panels, said electrostatic forces being generated by applying voltages to said first and second electrodes and to panels of said at least one pixel.

35. A plurality of pixel structures according to claim 34 wherein a topmost panel in a stack of panels in said first position is rotated to a second position with all panels in said first position and said first electrode grounded.

36. A plurality of pixel structures according to claim 35 wherein when there is at least one panel in said second position, a voltage is applied to a topmost panel in said second position and said second electrode is grounded to rotate said topmost panel in said first position.

37. A plurality of pixel structures according to claim 35 wherein when there are no panels in said second position a voltage is applied to said second electrode to rotate said topmost panel in said first position.

38. A plurality of pixel structures according to claim 34 wherein a topmost panel in a stack of panels in said second position is rotated to a first position with all panels in said second position and said second electrode grounded.

39. A plurality of pixel structures according to claim 38 wherein when there is at least one panel in said first position, a voltage is applied to a topmost panel in said first position and said first electrode is grounded to rotate said topmost panel in said second position.

40. A plurality of pixel structures according to claim 39 wherein when there are no panels in said first position a voltage is applied to said first electrode to rotate said topmost panel in said second position.

41. A plurality of pixel structures according to claim 34 wherein a topmost panel of at least one panel in said second position is rotated to a fir position by grounding said first electrode and applying a first voltage to said topmost panel in said second position.

42. A plurality of pixel structures according to claim 40 wherein, when there is at least one panel in said first position a second voltage is applied to a topmost panel of said at least one panel in said first position and all other panels in said first position are grounded and wherein, said second voltage is different from said first voltage.

43. A plurality of pixel structures according to claim 41 wherein, when there is at least one panel beneath said topmost panel in said second position, said first voltage is applied to a panel immediately below said topmost panel in said second position and all other panels in said second position and said second electrode are grounded.

44. A plurality of pixel structures according to claim 41 wherein, when there are no panels below said topmost panel in said second position said first voltage is applied to said second electrode.

45. A plurality of pixel structures according to claim 26 wherein, when at least one panel of said at least one pixel is in said first position and at least one panel is in said second position, said first side of a topmost panel in said first position and said second side of a topmost panel in said second position have a same finish.

46. A plurality of pixel structures according to claim 44 wherein said first region and said second side of a topmost panel in said second position have a same finish when all of panels of said at least one pixel are in said second position.

47. A plurality of pixel structures according to claim 45 wherein said second region and said first side of a topmost panel in said first position have a same finish when all panels of said at least one pixel are in said first position.

48. A plurality of pixel structures according to claim 46 wherein no two same finishes display a same color.

49. A plurality of pixel structures according to claim 48 wherein at least one of said same finishes is luminescent.

50. A plurality of pixel structures according to claim 48 wherein said at least one pixel comprises two panels.

51. A plurality of pixel structures according to claim 50 wherein each of said same finishes is a different color of a tristimulus set of colors.

52. A plurality of pixel structures according to claim 46 wherein each of said same finishes displays a different gray level.

53. A plurality of pixel structures according to claim 8 wherein at least one panel of at least one pixel of said plurality of pixels is formed with at least one through hole near an edge thereof.

54. A plurality of pixel structures according to claim 53 wherein said at least one pixel comprises at least one bracket fastened to said surface, said at least one bracket having a U-shaped member having legs wherein, said U-shaped member passes through one of said at least one through hole so as to rotatably mount said at least one panel to said surface.

55. A plurality of pixel structures according to claim 54 wherein said at least one panel is formed with at least one slot in said edge that joins with one of said at least one through hole through which a U-shaped member passes.

56. A plurality of pixel structures according to claim 55 wherein said bracket of said U-shaped member that passes through a through hole joining with a slot comprises a septum that is positioned in said slot and wherein said septum limits motion of said at least one panel parallel to said edge.

57. A plurality of pixel structures according to claim 54 wherein said at least one panel is formed with clearance slots that enable said at least one panel to rotate from said first position to said second position without said at least one panel making physical contact with a bracket that couples a different one of said at least one panel to said surface.

58. A plurality of pixel structures according to claim 54 wherein at least one of said brackets is fastened to said surface of said at least one pixel at a single localized region of said bracket that is located near to one of said legs.

59. A plurality of pixel structures according to claim 54 wherein at least one of said brackets is fastened to said surface of said at least one pixel at two localized regions of said bracket wherein each of said localized regions is located near to a different one of said legs.

60. A plurality of pixel structures according to claim 54 wherein at least one of said brackets that couples said at least one panel to said surface of said at least one pixel is formed from a conducting material.

61. A plurality of pixel structures according to claim 60 wherein said surface of said at least one pixel comprises at least one electrode in addition to said first and second electrodes.

62. A plurality of pixel structures according to claim 61 wherein said at least one bracket formed from said conducting material is fastened to one of said at least one additional electrodes.

63. A plurality of pixel structures according to claim 62 wherein when regions of said at least one panel are in physical contact with said electrode or said conducting bracket, said panel is in electrical contact with said electrode.

64. A plurality of pixel structures according to claim 63 wherein voltage is applied to said panel by applying voltage to said electrode.

65. A plurality of pixel structures according to claim 1 wherein at least one panel of a at least one pixel of said plurality of pixels is formed with a protuberance at both ends of a single edge thereof.

66. A plurality of pixel structures according to claim 65 wherein said at least one pixel comprises two brackets fastened to said surface of said at least one pixel, wherein each bracket comprises a U-shaped member having two legs wherein said U-shaped member of each bracket loops around a different one of said protuberances so as to rotatably mount said at least one panel to said surface.

67. A plurality of pixel structures according to claim 66 wherein at least one of said brackets has a surface that presses against an end of one of said protuberances wherein said surface limits motion of said at least one panel parallel to said single edge.

68. A plurality of pixel structures according to claim 1 wherein said first and second regions of said surface of at least one pixel of said plurality of pixels are planar and wherein an angle between the plane of said first region and the plane of said second region is less than 180°.

69. A plurality of pixel structures according to claim 68 wherein said angle is greater than 140°.

70. A plurality of pixel structures according to claim 68 wherein said angle is greater than 160°.

* * * * *

UNITED STATES PATENT AND TRADEMARK OFFICE
CERTIFICATE OF CORRECTION

PATENT NO. : 6,600,474 B1  Page 1 of 1
DATED : July 29, 2003
INVENTOR(S) : Amichai Heines et al.

It is certified that error appears in the above-identified patent and that said Letters Patent is hereby corrected as shown below:

<u>Title page,</u>
Item [56], References Cited, add:
-- OTHER PUBLICATIONS
Chahoud, M. et al; "Etching simulation of convex and mixed InP and Si structures; "September 15, 1998; Sensors and Actuators A; Vol. 69, No. 3, pages 51-258, XP004140048
"Feinerman, A.D. et al.; "Millimeter-Scale Actuator with Fiber-Optic Roller Bearings;" March 1, 1995, Journal of Microelectromechanical Systems; Vol. 4, No. 1; pages 28-33, XP000506491 --

Signed and Sealed this

Seventeenth Day of February, 2004

JON W. DUDAS
*Acting Director of the United States Patent and Trademark Office*